(12) United States Patent
Hill

(10) Patent No.: US 6,806,962 B2
(45) Date of Patent: Oct. 19, 2004

(54) TILTED INTERFEROMETER

(75) Inventor: Henry Allen Hill, Tucson, AZ (US)

(73) Assignee: Zygo Corporation, Middlefield, CT (US)

( * ) Notice: Subject to any disclaimer, the term of this patent is extended or adjusted under 35 U.S.C. 154(b) by 146 days.

(21) Appl. No.: 10/218,965

(22) Filed: Aug. 14, 2002

(65) Prior Publication Data

US 2003/0038947 A1 Feb. 27, 2003

Related U.S. Application Data

(60) Provisional application No. 60/314,490, filed on Aug. 23, 2001.

(51) Int. Cl.[7] ............................. G01B 9/02; G01B 11/02; G01N 21/41
(52) U.S. Cl. ....................... 356/493; 356/491; 356/492; 356/494; 356/486; 356/487; 356/514; 356/517
(58) Field of Search ................................. 356/493, 491, 356/492, 494, 486, 487, 514, 517; 756/493

(56) References Cited

U.S. PATENT DOCUMENTS

| 3,450,476 A | * | 6/1969 | Rando | ......................... 356/517 |
| 4,189,233 A | * | 2/1980 | Hurt et al. | .................. 356/4.02 |
| 4,347,000 A | * | 8/1982 | Lacoste | ....................... 356/513 |
| 4,784,490 A | * | 11/1988 | Wayne | ....................... 356/487 |
| 4,865,450 A | * | 9/1989 | Munechika et al. | ......... 356/489 |
| 5,194,893 A | * | 3/1993 | Nishi | ........................... 355/53 |
| 5,398,112 A | * | 3/1995 | Ai et al. | ...................... 356/514 |
| 6,137,574 A | * | 10/2000 | Hill | .............................. 356/486 |
| 6,163,379 A | * | 12/2000 | de Groot | ..................... 356/493 |
| 6,246,481 B1 | | 6/2001 | Hill | |
| 6,252,668 B1 | * | 6/2001 | Hill | .............................. 356/487 |
| 6,330,065 B1 | * | 12/2001 | Hill | .............................. 356/485 |

OTHER PUBLICATIONS

Wu, Chien–Ming and Deslattes, Richard D., "Analytical modeling of the periodic nonlinearity in heterodyne interferometry", Applied Optics, vol. 37, No. 28, Oct. 1, 1998. Pp. 6696–6700.

* cited by examiner

Primary Examiner—Frank G. Font
Assistant Examiner—Khaled Brown
(74) Attorney, Agent, or Firm—Francis J. Caufield

(57) ABSTRACT

The invention comprises methods and apparatus for reducing sub-harmonic cyclic errors by rotating by a small angle an interferometer or elements thereof. The rotation of the interferometer or selective elements thereof introduces a corresponding small angle between a sub-harmonic type spurious beam that subsequently interferes with either the reference or measurement beam so that the fringe contrast of the interference terms between the subharmonic spurious beam and either the reference or measurement beam is reduced by a required factor for a given use application thereby reducing nonlinearities in the phase signal.

12 Claims, 25 Drawing Sheets

TILTED INTERFEROMETER

CROSS REFERENCE TO RELATED APPLICATION

This application claims priority from U.S. Provisional Patent Application No. 60/314,490 filed on Aug. 23, 2001 in the name of Henry Allen Hill and bearing the title "TILTED INTERFEROMETER", the entire contents of which are incorporated herein by reference.

BACKGROUND OF THE INVENTION

This invention in general relates to interferometers, e.g., displacement measuring and dispersion interferometers that measure displacements of a measurement object such as a mask stage or a wafer stage in a lithography scanner or stepper system, and also interferometers that monitor wavelength and determine intrinsic properties of gases. More particularly, it relates to optical means by which cyclic errors that would otherwise be present in the signals generated in such interferometers can be acceptably reduced or substantially eliminated.

Displacement measuring interferometers monitor changes in the position and orientation of a measurement object relative to a reference object based on an optical interference signal. The interferometer generates the optical interference signal by overlapping and interfering a measurement beam reflected from the measurement object with a reference beam reflected from the reference object.

In many applications, the measurement and reference beams have orthogonal polarizations and different frequencies. The different frequencies can be produced, for example, by laser Zeeman splitting, acousto-optical modulation, or internal to the laser using birefringent elements, or the like. The orthogonal polarizations allow a polarizing beam splitter to direct the measurement and reference beams to the measurement and reference objects, respectively, and combine the reflected measurement and reference beams to form overlapping exit measurement and reference beams. The overlapping exit beams form an output beam that subsequently passes through a polarizer. The polarizer mixes polarizations of the exit measurement and reference beams to form a mixed optical beam. Components of the exit measurement and reference beams in the mixed optical beam interfere with one another so that the intensity of the mixed beam varies with the relative phase of the exit measurement and reference beams. A detector measures the time-dependent intensity of the mixed beam and generates an electrical interference signal proportional to that intensity. When the measurement and reference beams have different frequencies, the electrical interference signal includes a "heterodyne" signal having a beat frequency equal to the difference between the frequencies of the exit measurement and reference beams. If the lengths of the measurement and reference paths are changing relative to one another, e.g., by translating a stage that includes the measurement object, the measured beat frequency includes a Doppler shift equal to $2vnpL/\lambda$, where $v$ is the relative speed of the measurement and reference objects, $\lambda$ is the wavelength of the measurement and reference beams, $n$ is the refractive index of the medium through which the light beams travel, e.g., air or vacuum, and $p$ is the number of passes to the reference and measurement objects. Changes in the relative position of the measurement object correspond to changes in the phase of the measured interference signal, with a $2\pi$ phase change substantially equal to a distance change $L$ of $\lambda/(np)$, where $L$ is a round-trip distance change, e.g., the change in distance to and from a stage that includes the measurement object.

Unfortunately, this equality is not always exact. Many interferometers include nonlinearities such as those known as "cyclic errors." The cyclic errors can be expressed as contributions to the phase and/or the intensity of the measured interference signal and have a sinusoidal dependence on the change in optical path length pnkL. In particular, the first order cyclic error in phase has a sinusoidal dependence on $(2\pi pnL)/\lambda$ and the second order cyclic error in phase has a sinusoidal dependence on $(2\pi pnL)/\lambda$. Higher order cyclic errors can also be present.

Cyclic errors can be produced by "beam mixing," in which a portion of an input beam that nominally forms the reference beam propagates along the measurement path and/or a portion of an input beam that nominally forms the measurement beam propagates along the reference path. Such beam mixing can be caused by ellipticity in the polarizations of the input beams and imperfections in the interferometer components, e.g., imperfections in a polarizing beam splitter used to direct orthogonally polarized input beams along respective reference and measurement paths. Because of beam mixing and the resulting cyclic errors, there is not a strictly linear relation between changes in the phase of the measured interference signal and the relative optical path length, pnL, between the reference and measurement paths. If not compensated, eliminated or acceptably reduced, cyclic errors caused by beam mixing can limit the accuracy of distance changes measured by an interferometer. Cyclic errors can also be produced by imperfections in transmissive surfaces that produce undesired multiple reflections within the interferometer and imperfections in components such as retroreflectors and/or phase retardation plates that produce undesired ellipticities in beams in the interferometer. For a general reference on the theoretical cause of cyclic error, see, for example, C. W. Wu and R. D. Deslattes, "Analytical modelling of the periodic nonlinearity in heterodyne interferometry," Applied Optics, 37, 6696–6700, 1998.

In dispersion measuring applications, optical path length measurements are made at multiple wavelengths, e.g., 532 nm and 1064 nm, and are used to measure dispersion of a gas in the measurement path of the distance measuring interferometer. The dispersion measurement can be used to convert the optical path length measured by a distance measuring interferometer into a physical length. Such a conversion can be important since changes in the measured optical path length can be caused by gas turbulence and/or by a change in the average density of the gas in the measurement arm even though the physical distance to the measurement object is unchanged. In addition to the extrinsic dispersion measurement, the conversion of the optical path length to a physical length requires knowledge of an intrinsic value of the gas. The factor $\Gamma$ is a suitable intrinsic value and is the reciprocal dispersive power of the gas for the wavelengths used in the dispersion interferometry. The factor $\Gamma$ can be measured separately or based on literature values. Cyclic errors in the interferometer also contribute to dispersion measurements and measurements of the factor $\Gamma$. In addition, cyclic errors can degrade interferometric measurements used to measure and/or monitor the wavelength of a beam.

Systems and methods have been provided for identifying, quantifying and compensating for cyclic errors as, for example, those described in U.S. Pat. No. 6,246,481 issued on Jun. 12, 2001 in the name of Henry A. Hill for "SYSTEMS AND METHODS FOR QUANTIFYING NONLIN- EARITIES IN INTERFEROMETRY SYSTEMS." Such systems and methods rely on the implementation of various algorithms via high speed electronics to operate.

Accordingly, it is a primary object of the present invention to provide a simple optical solution for substantially eliminating and/or reducing cyclic errors in interferometer systems.

It is another object of the present invention to provide an optical solution to the elimination and/or reduction of cyclic errors in interferometer systems to relieve the burden that would otherwise be placed on associated electronics.

It is still another object of the present invention to provide an optical solution to the elimination and/or reduction of cyclic errors to reduce the accuracy or requirements imposed on the various components of interferometry systems.

Other objects of the invention will, in part, be obvious and will, in part, appear hereinafter when the description to follow is read in conjunction with the drawings.

SUMMARY OF THE INVENTION

The invention comprises methods and apparatus for reducing subharmonic cyclic errors by rotating by a small angle an interferometer or elements thereof. The rotation of the interferometer or selective elements thereof introduces a corresponding small angle between a subharmonic type spurious beam that subsequently interferes with either the reference or measurement beam so that the fringe contrast of the interference terms between the subharmonic spurious beam and either the reference or measurement beam is reduced by a required factor for a given use application thereby reducing nonlinearities in the phase signal. A subharmonic type spurious beam is one that results in a subharmonic cyclic error if not otherwise compensated or eliminated.

BRIEF DESCRIPTION OF THE DRAWINGS

The structure, operation, and methodology of the invention, together with other objects and advantages thereof, may best be understood by reading the detailed description in conjunction with the drawings in which each part has an assigned numeral that identifies it wherever it appears in the various drawings and wherein:

FIGS. 22–25 relate to lithography and its application to manufacturing integrated circuits wherein FIG. 22 is a schematic drawing of a lithography exposure system employing the interferometry system;

FIGS. 23 and 24 are flow charts describing steps in manufacturing integrated circuits; and FIG. 25 is a schematic of a beam writing system employing the interferometry system.

DETAILED DESCRIPTION OF THE INVENTION

The present invention generally relates to apparatus and methods for reducing subharmonic cyclic errors by rotating or tilting by a small angle an interferometer or elements thereof. The rotation of the interferometer or selective elements thereof introduces a corresponding small angle between a subharmonic type spurious beam that subsequently interferes with either the reference or measurement beam so that the fringe contrast of the interference terms between the subharmonic spurious beam and either the reference or measurement beam is reduced by a required factor for a given use application thereby reducing nonlinearities in the phase signal.

A subharmonic type spurious beam is one that results in a subharmonic cyclic error if not otherwise compensated or eliminated. As will be seen, cyclic errors may be generated in commonly used interferometer systems by: (1) polarization mixing in laser source; (2) polarization mixing in interferometers; (3) retardation plate optical effects; (4) stage mirror optical effects; (5) ghost reflections; (6) nonlinearities in analog circuits; (7) aliasing in digital electronics; and (8) electronic mixing. The two potential types of cyclic errors with which the present invention is concerned comprise stage mirror orientation dependent cyclic errors and stage mirror orientation independent cyclic errors. To understand how such cyclic errors can arise, a typical DPMI will first be described having a phase signal containing at least one cyclic error component. Then the square root of the signal power spectrum out of the DPMI detector will be shown to illustrate cyclic errors in the detector signal. This will be followed by illustrations of various types of cyclic error contributors along with their magnitudes. Finally, the inventive solution for substantially eliminating and/or acceptably reducing cyclic errors will be described.

Figure 1:
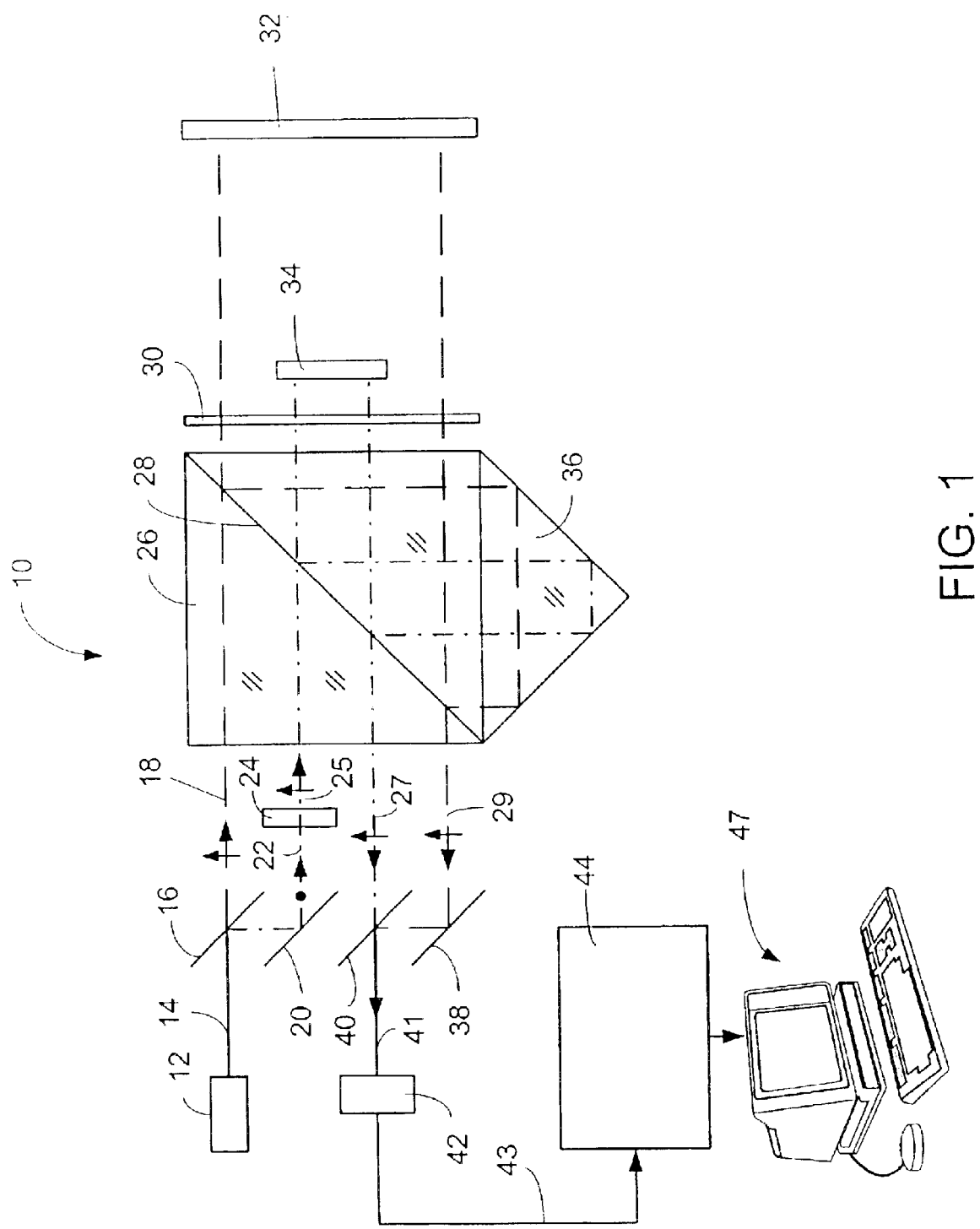
FIG. 1 is a diagrammatic plan view of a differential plane mirror interferometer (DPMI) system of the type in which cyclic errors may be present.

Reference will now be made to FIG. 1 which shows a differential plane mirror interferometer (DPMI) system 10. System 10 comprises a source 12, polarizing beam splitter 16, and reflector 20. Source 12 generates a beam 14 comprising two orthogonally polarized components having a difference in frequencies, $f$. A source of input beam 14 such as a laser can be any of a variety of frequency modulation apparatus and/or lasers. For example, the laser can be a gas laser, e.g., a HeNe laser, stabilized in any of a variety of conventional techniques known to those skilled in the art, see for example, T. Baer et al., "Frequency Stabilization of a 0.633 µm HeNe-longitudinal Zeeman Laser," *Applied Optics*, 19, 3173–3177 (1980); Burgwald et al., U.S. Pat. No. 3,889,207, issued Jun. 10, 1975; and Sandstrom et al., U.S. Pat. No. 3,662,279, issued May 9, 1972. Alternatively, the laser can be a diode laser frequency stabilized in one of a variety of conventional techniques known to those skilled in the art, see for example, T. Okoshi and K. Kikuchi, "Frequency Stabilization of Semiconductor Lasers for Heterodyne-type Optical Communication Systems," *Electronic Letters*, 16, 179–181 (1980) and S. Yamaqguchi and M. Suzuki, "Simultaneous Stabilization of the Frequency and Power of an AlGaAs Semiconductor Laser by Use of the Optogalvanic Effect of Krypton," IEEE *J. Quantum Electronics*, QE-19, 1514–1519 (1983).

Two optical frequencies may be produced by one of the following techniques: (1) use of a Zeeman split laser, see for example, Bagley et al., U.S. Pat. No. 3,458,259, issued Jul. 29, 1969; G. Bouwhuis, "Interferometrie Mit Gaslasers," Ned. T. Natuurk, 34, 225–232 (August 1968); Bagley et al., U.S. Pat. No. 3,656,853, issued Apr. 18, 1972; and H. Matsumoto, "Recent interferometric measurements using stabilized lasers," *Precision Engineering*, 6(2), 87–94 (1984); (2) use of a pair of acousto-optical Bragg cells, see for example, Y. Ohtsuka and K. Itoh, "Two-frequency Laser Interferometer for Small Displacement Measurements in a Low Frequency Range," *Applied Optics*, 18(2), 219–224 (1979); N. Massie et al., "Measuring Laser Flow Fields With a 64-Channel Heterodyne Interferometer," *Applied Optics*, 22(14), 2141–2151 (1983); Y. Ohtsuka and M. Tsubokawa, "Dynamic Two-frequency Interferometry for Small Displacement Measurements," *Optics and Laser Technology*, 16, 25–29 (1984); H. Matsumoto, ibid.; P. Dirksen, et al., U.S. Pat. No. 5,485,272, issued Jan. 16, 1996; N. A. Riza and M. M. K. Howlader, "Acousto-optic system for the generation and control of tunable low-frequency signals," *Opt Eng.*, 35(4), 920-925 (1996); (3) use of a single acousto-optic Bragg cell, see for example, G. E. Sommargren, commonly owned U.S. Pat. No. 4,684,828, issued Aug. 4, 1987; G. E. Sommargren, commonly owned U.S. Pat. No. 4,687,958, issued Aug. 18, 1987; P. Dirksen, et al., ibid.; (4) use of two longitudinal modes of a randomly polarized HeNe laser, see for example, J. B. Ferguson and R. H. Morris, "Single Mode Collapse in 6328 Å HeNe Lasers," *Applied Optics*, 17(18), 2924–2929 (1978); (5) use of birefringent elements or the like internal to the laser, see for example, V. Evtuhov and A. E. Siegman, "A "Twisted-Mode" Technique for Obtaining Axially Uniform Energy Density in a Laser Cavity," *Applied Optics*, 4(1), 142–143 (1965); or the use of the systems described in U.S. Pat. Application with Ser. No. 09/061,928 filed Apr. 17, 1998 entitled "Apparatus to Transform Two Non-Parallel Propagating Optical Beam Components into Two Orthogonally Polarized Beam Components" by H. A. Hill, the contents of which are incorporated herein by reference.

The specific device used for the source of beam 12 will determine the diameter and divergence of beam 12. For some sources, e.g., a diode laser, it will likely be necessary to use conventional beam shaping optics, e.g., a conventional microscope objective, to provide beam 12 with a suitable diameter and divergence for elements that follow. When the source is a HeNe laser, for example, beam-shaping optics may not be required.

Beam 14 is separated into its polarized beam components by polarizing beam splitter 16 which transmits p-polarized component of beam 14 (indicated by the vertical arrow) as polarized beam 18 while reflecting its orthogonally, s-polarized component to reflector 20 that, in turn, directs it to a half-wave plate 24 as s-polarized beam component 22 (indicated by the black circular dot). Beam 22 is converted by half-wave plate 24 to a p-polarized beam component 25 thus having the same state of polarization as p-polarized beam component 18.

Both p-polarized beam components 18 and 25 enter a polarizing beam splitter 26 having a polarizing beam splitting layer 28 which transmits both for further downstream travel. Beam component 25 proceeds to a reference mirror 34 via a quarter-wave plate 30, reflects from the reference mirror 34, and in the process of traveling back through quarter-wave plate 30 the second time, has its state of polarization changed so that it is now s-polarized again. Afterwards, beam component 25 proceeds to retroreflector 36 from which it is directed to beam splitter layer 28. Beam component 25 is reflected from beam splitter layer 28 to travel to reference mirror 34 again via quarter-wave plate 30; this being its second pass to reference mirror 34. Upon reflection from reference mirror 34, beam 25 again passes through quarter-wave plate 30 to become a p-polarized beam component whereby it is transmitted by beam splitter layer 28 to become p-polarized reference beam component 27.

In similar fashion, p-polarized beam component 18 makes a double pass to object mirror 32 and is returned as p-polarized measurement beam component 29. Reference beam component 27 and measurement beam component 29 are combined for travel along the same path as optical beam 41 which contains phase information about the optical path difference over which the reference and measurement beams traveled to and from the and object and reference mirrors, 32 and 34, respectively.

Optical beam 41 is passed to a detector 42 that converts it to an electrical signal 43 that, in turn, is passed to a phase analyzer 44. Phase information is extracted from electrical signal 43 by phase analyzer 44 and is thereafter sent to a computer 47 that is programmed with suitable software containing algorithms for relating the phase information to the physical path length between the reference and object mirrors. Computer 47 also handles general housekeeping functions, serves as an operator interface, and generates output data in graphical and digital formats. It will be recognized that computer 47 may also perform the phase analysis directly on electrical signal 43.

Figure 2:
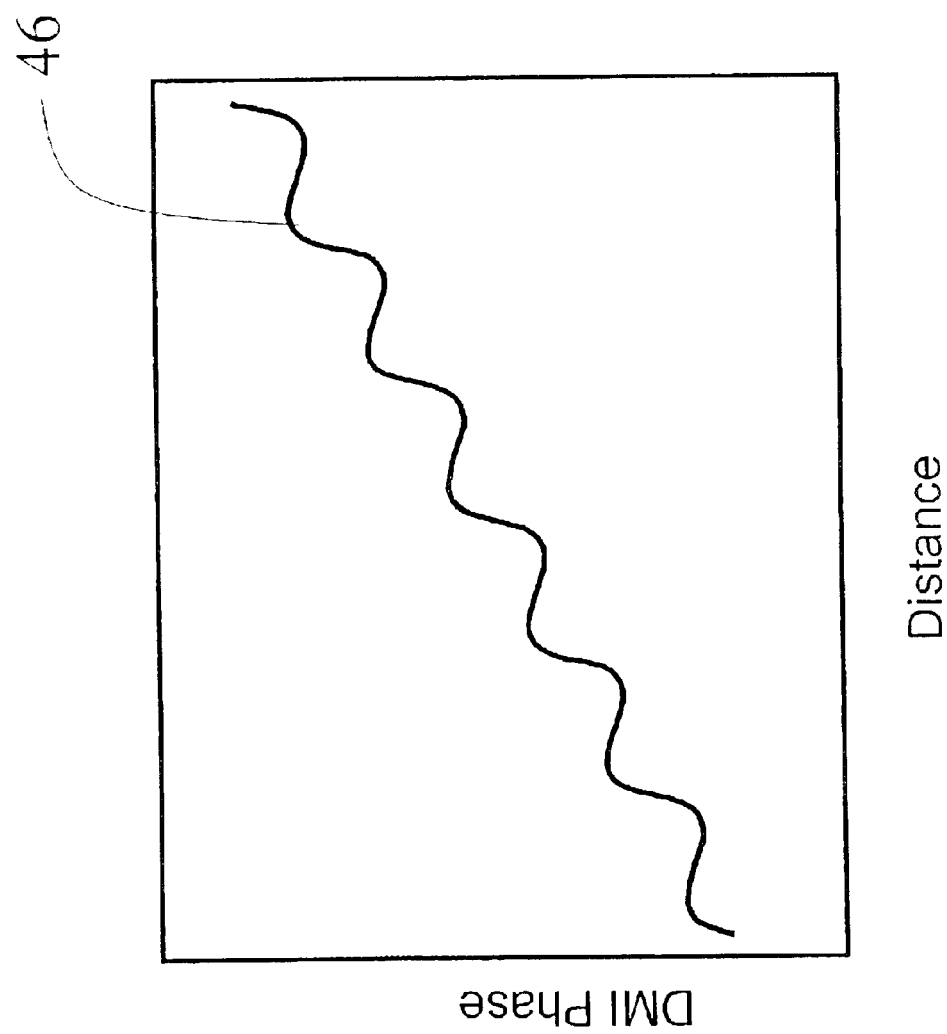
FIG. 2 is a graph showing diagrammatically how the phase signal in a distance measuring interferometer (DMI) may change with measured distance when at least one source of cyclic error is present having periodic characteristics.

A diagrammatic graphical relationship generated by computer 47 is shown in FIG. 2 as curve 46 that relates DMI phase to physical distance. Curve 46 is shown in exaggerated fashion to illustrate that it contains undesirable nonlinearities having a periodic characteristic because of the presence of cyclic errors. It will be appreciated that, in practice, curve 46 is typically more complex since it may contain a plurality of cyclic errors at once.

Figure 3:
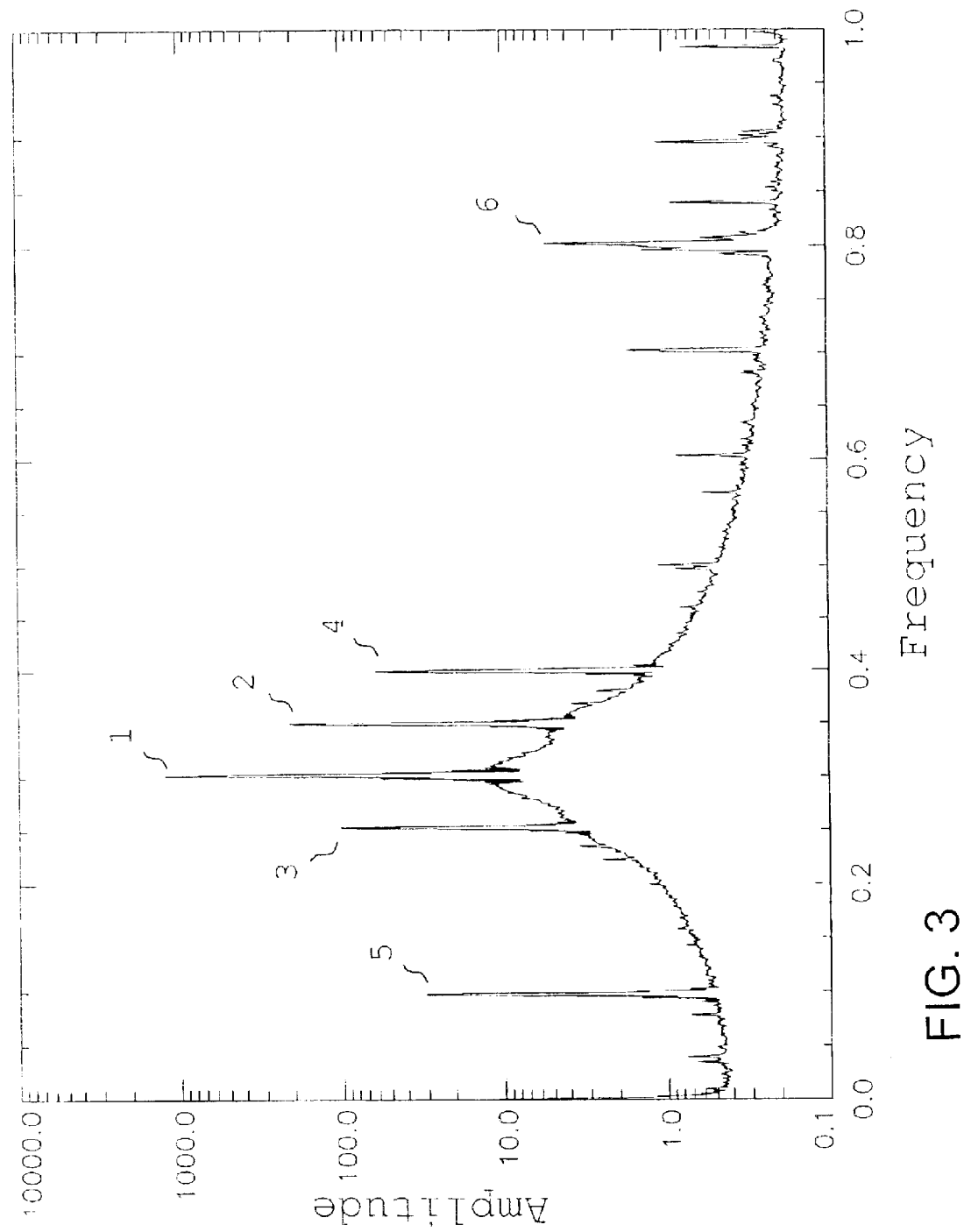
FIG. 3 is a graph of the square root of the power spectrum of the detector signal which includes at least one undesirable cyclic error term.

To understand the source of the nonlinearities in curve 46, it is useful to analyze power spectrum of the detector signal 43. The is seen as the curve of FIG. 3 showing amplitude versus frequency. More particularly, FIG. 3 shows the square root of the power spectrum of the signal out of the detector 42 where the interferometer is, again, a differential plane mirror interferometer (DPMI) as described.

In FIG. 3, peak 1 is the primary, i.e., the desired peak. Peak 2 is a half harmonic cyclic error term and peak 3 is a third harmonic of a half harmonic cyclic error term. The amplitudes of peaks 2 and 3 are 4 nm and 2 nm, respectively. The next largest amplitude peaks, 4, 5, and 6 are not associated with subharmonic cyclic errors. The amplitudes of peaks 4, 5, and 6 are 1.2 nm, 0.6 nm, and 0.1 nm, respectively.

Sources of peaks 4 and 5 are, for example, leakage at the polarizing beam splitter 26 in the DPMI and polarization mixing in the source 12. The sources of peaks 2 and 3 comprise one or more of the sources of the subharmonic cyclic errors listed hereinabove. The frequency scale is normalized to the Nyquist frequency. The frequency of peak 4 corresponds to the normalized split frequency 0.4 of the input beam and the frequency of peak 5 corresponds to the normalized Doppler shift frequency of 0.1. The frequency of peak 1 is down-shifted to a normalized frequency 0.3 by the Doppler shift frequency 0.1 from the normalized split frequency at 0.4.

As will be seen hereinafter, peaks 2 and 3 are eliminated by a rotation of the interferometer 10 or one or more of its elements by 0.001 radians for a beam diameter of 5 mm, it being understood that the required small angle of rotation or tilt is at least in part dependent on the diameter of the input beam.

To understand the physical sources for the presence of various cyclic error components or subharmonics thereof in the power spectrum of FIG. 3, reference will now be made to FIGS. 4 through 11 which are diagrammatic illustrations of stage mirror dependent cyclic errors that can be present in a high stability plane mirror interferometer (HSPMI). The amplitudes of stage mirror orientation dependent cyclic errors are generally the larger of the two types of cyclic errors.

Figure 4:
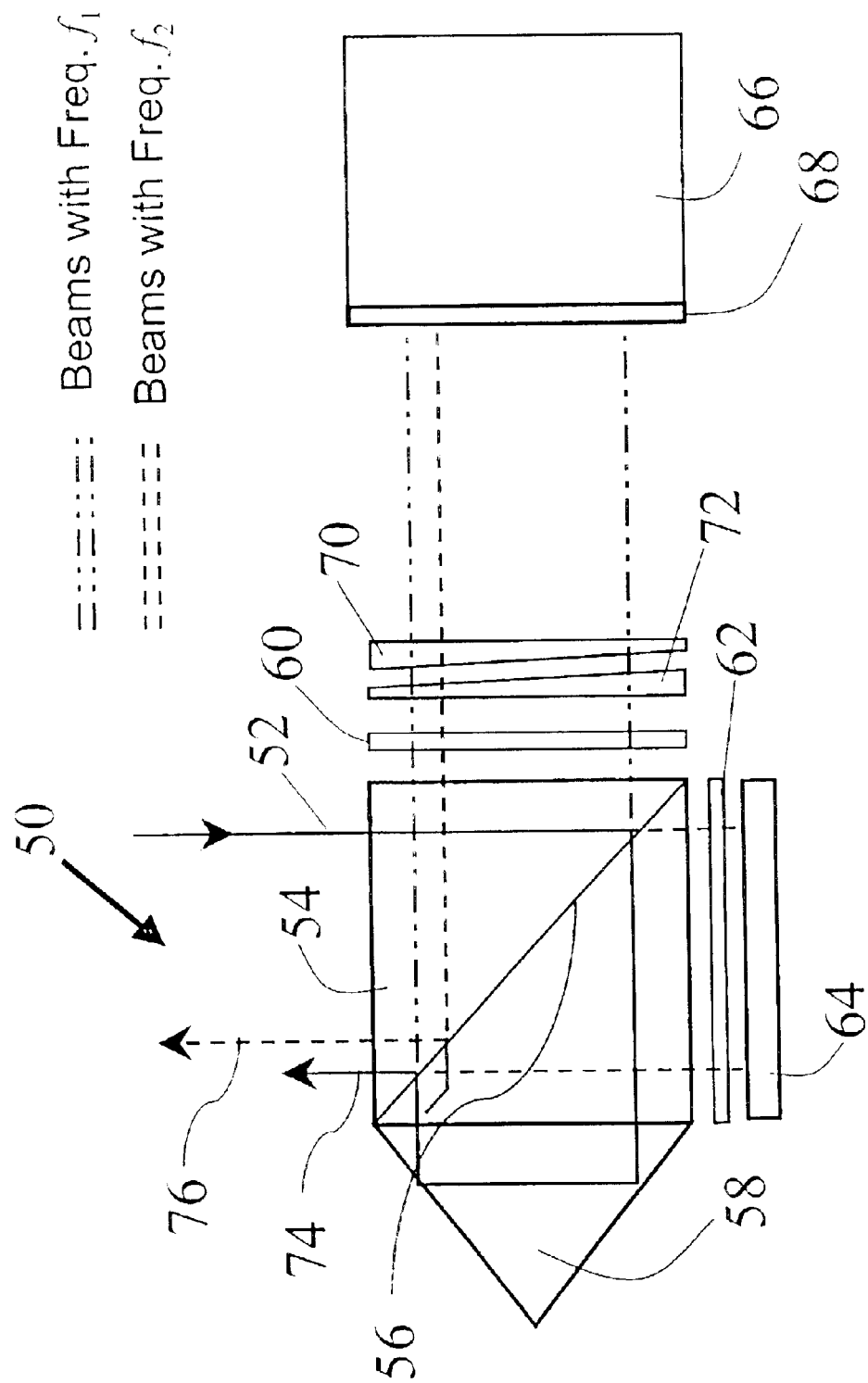
FIGS. 4 through 11 are diagrammatic illustrations of stage mirror dependent cyclic errors that can be present in a high stability plane mirror interferometer (HSPMI)

Referring now to FIG. 4, there is shown a high stability plane mirror interferometer (HSPMI) system 50. An input beam 52 is provided in the usual way with orthogonally polarized beam components with frequencies $f_1$ and $f_2$ indicated by the dash-dot-dot and short dashed lines, respectively. System 50 has as major components polarizing beam splitter 54 with polarizing beam splitter layer 56; a retroreflector 58; quarter-wave plate 62; reference mirror 64; quarter-wave plate 60; moving stage 66 with attached object mirror 68; and steering wedges 70 and 72, which may or may not be present but have been included here for alignment purposes.

As is usual, the polarized components of input beam 52 are split at the polarizing beam splitter layer 56 on the basis of their linear polarization state; one to travel twice to the reference mirror 64 and one to make a double pass to the object mirror 68 before being combined to provide the main output beam 74. However, in this case, the reference beam after having traveled once to the retroreflector 58 has its state of polarization changed slightly, but enough, to partially travel through the polarizing beam splitter layer 56 to reflect off the stage mirror 68 and be combined as a ghost beam 76 as an interfering component in main beam 74, thus becoming a cyclic error contributor due to polarization mixing caused by a polarization shift induced by the retroreflector. It will be appreciated that in this figure and those to follow that the path of the ghost beams has been greatly exaggerated for purposes of explanation but, in practice, actually overlap with the main beam. The subsequent subharmonic cyclic error term appears when the reference mirror surface is optically aligned with the stage mirror 68 and can have an amplitude from 2.5 to 5.0 nm.

Figure 5:
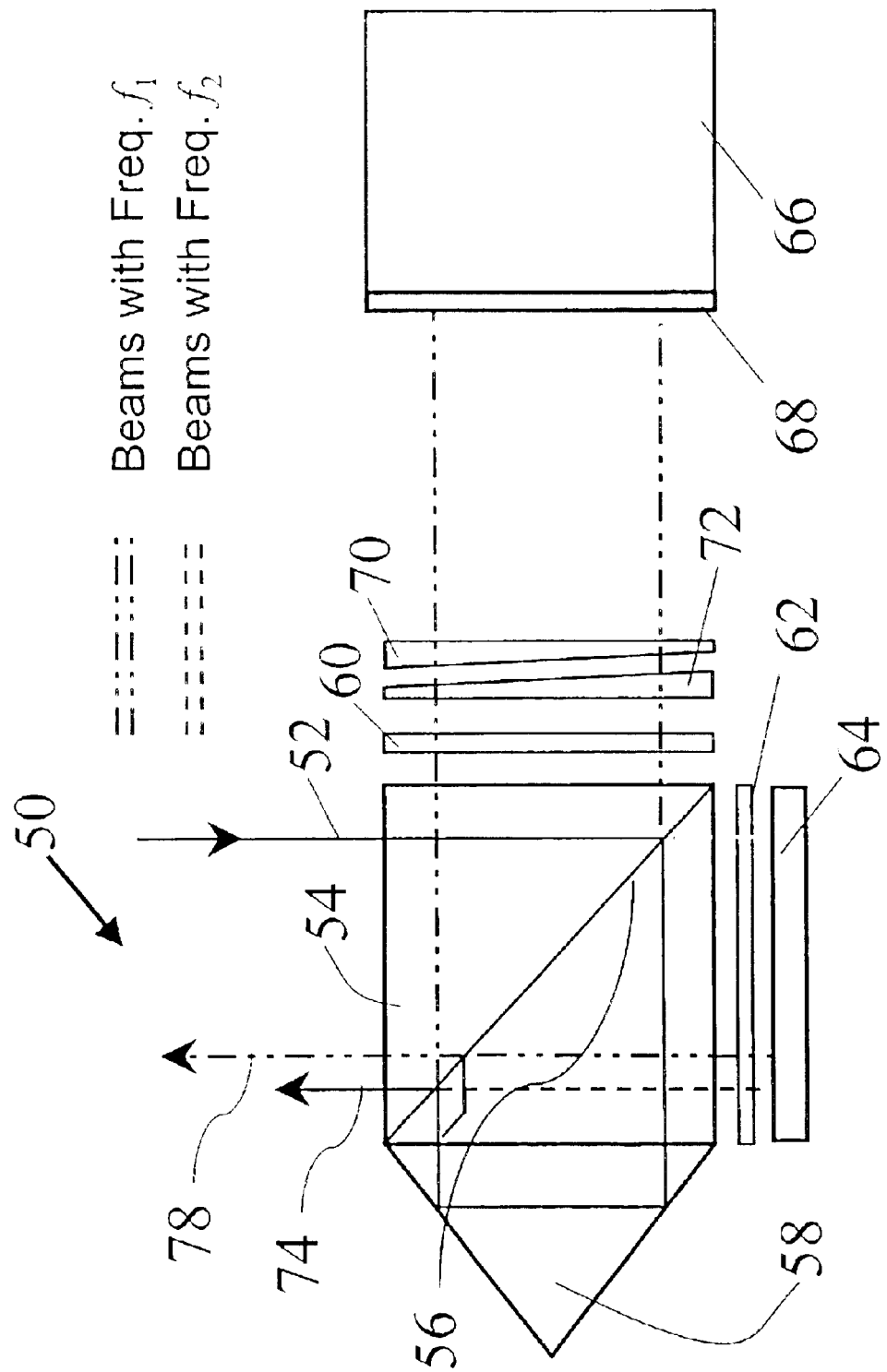

FIG. 5 is similar to FIG. 4 where all the same components carry the same numerical identity, as will be the case throughout. However, the cyclic error here arises because of polarization mixing due to a slight polarization shift of the object beam by the retroreflector 58 to cause ghost beam 78 that mixes with the reference and measurement beams at the detector. Again, the subsequent subharmonic cyclic error term appears when the reference mirror 64 and object mirror 68 are optically aligned and can be from 2.5 to 5.0 nm in amplitude.

Figure 6:
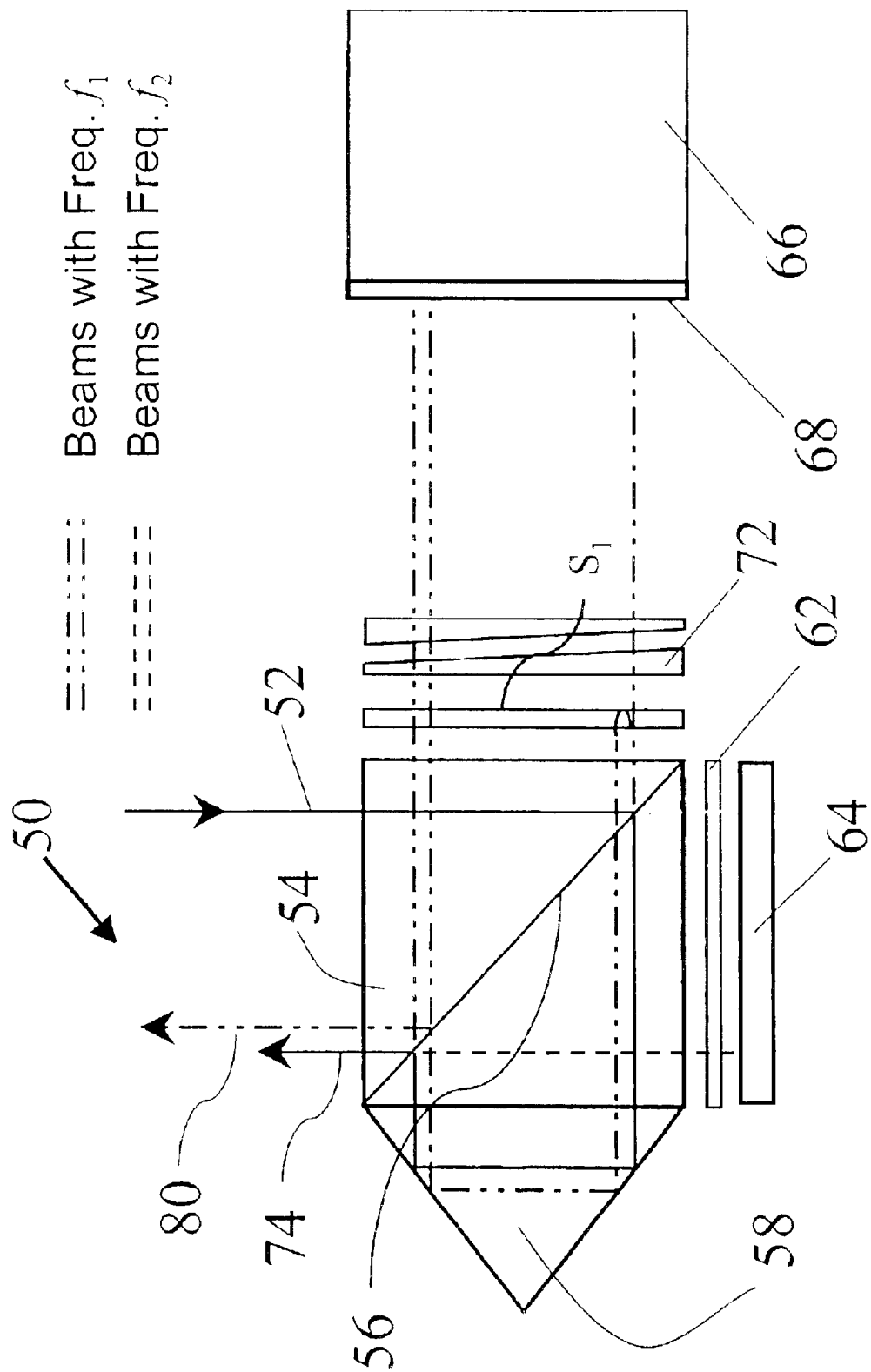

In FIG. 6, a ghost beam 80 is generated as the result of a reflection off surface $S_1$ of quarter-wave plate 60. The component reflected from surface $S_1$ is polarized such that it can travel to the object mirror 68 prior to becoming a component in main beam 74. The amplitude of the subsequent cyclic error term can be from 1.5 to 3.0 nm.

Figure 7:
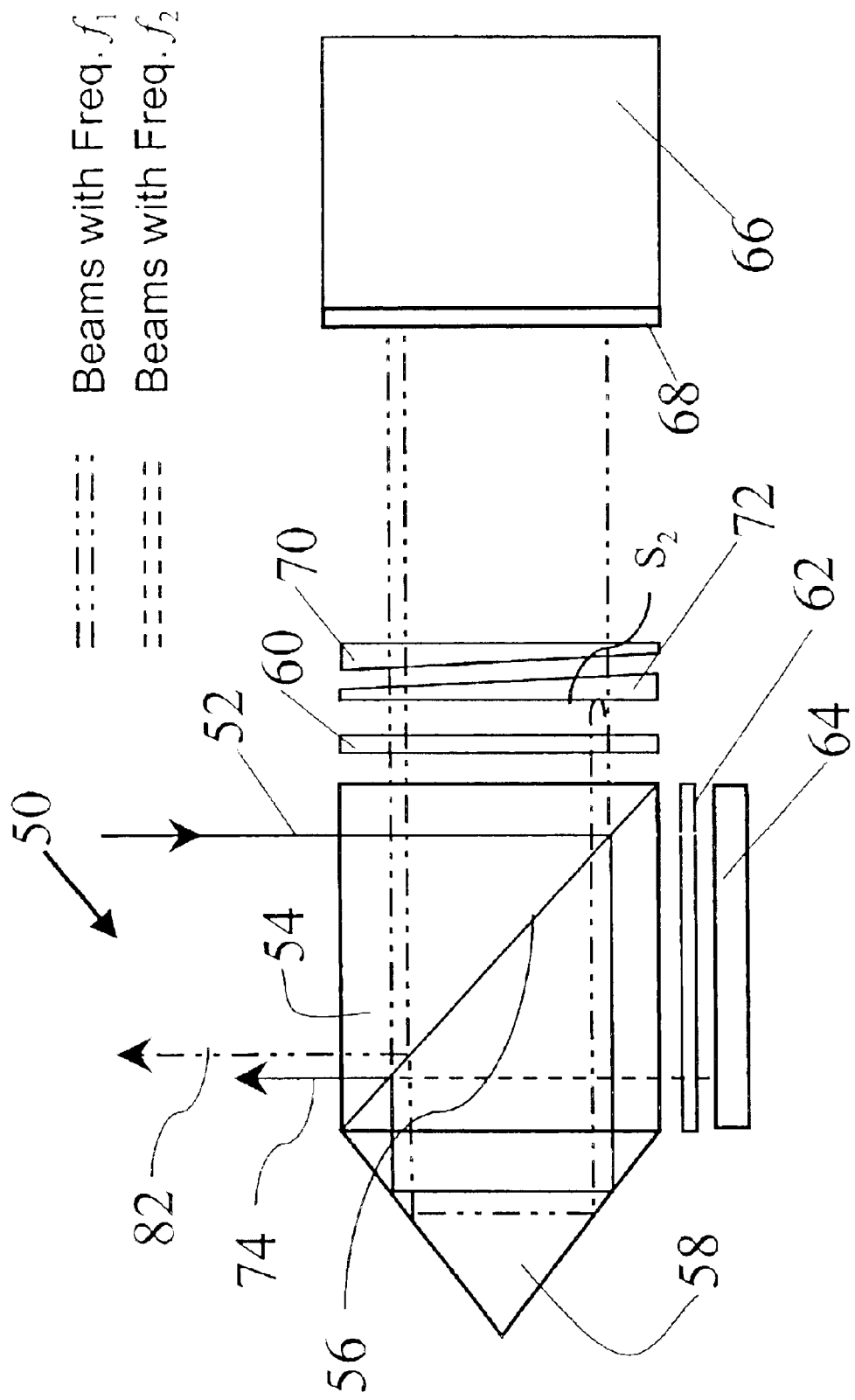

FIG. 7 is similar to FIG. 6, except that a ghost beam 82 has as its origins an initial reflection off surface $S_2$ of steering wedge 72. The amplitude of the subsequent cyclic error term can be from 1.5 to 3.0 nm.

Figure 8:
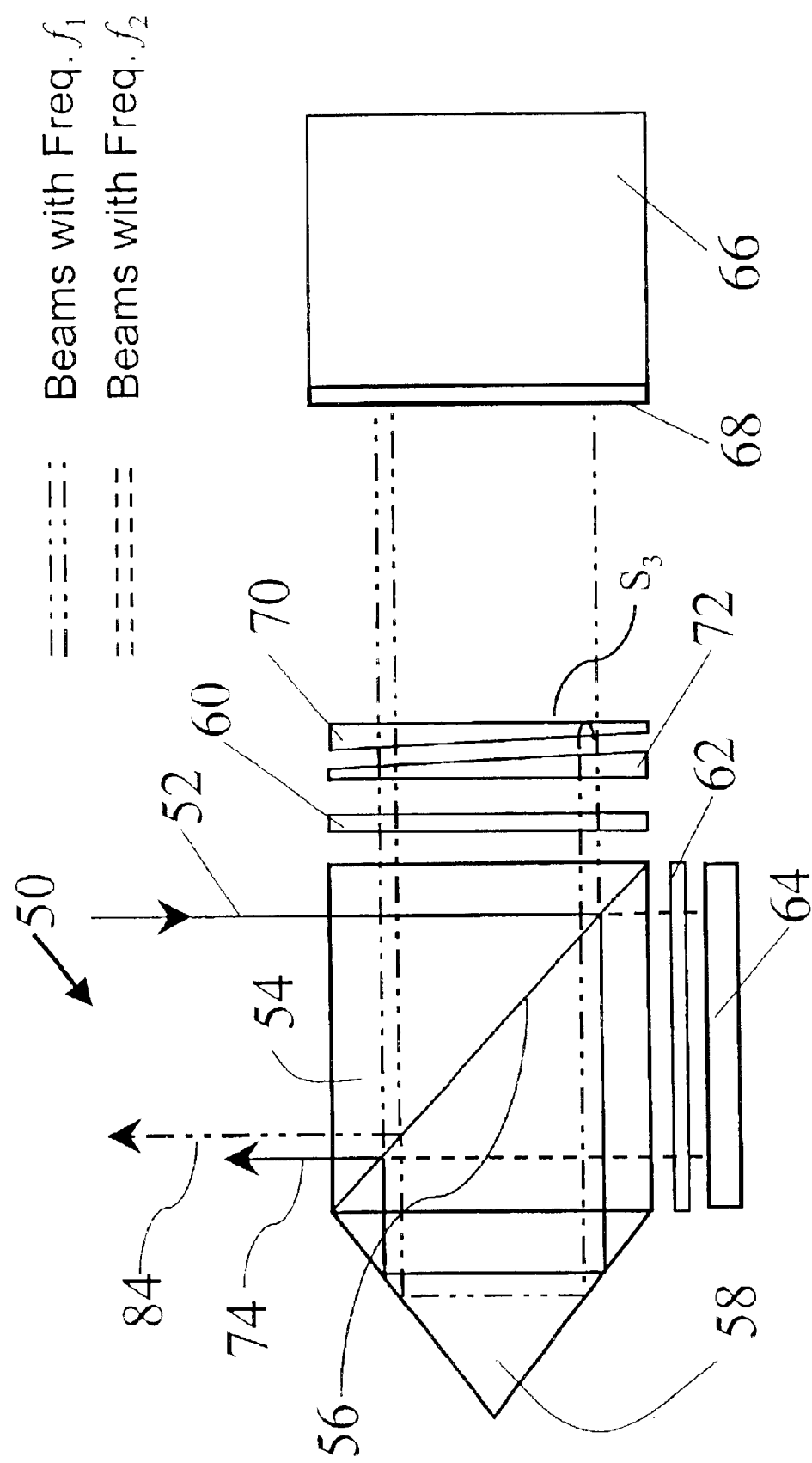

FIG. 8 is similar to FIGS. 6 and 7, except that a ghost beam 84 has as its origins a reflection from surface $S_3$ of steering wedge 70. The amplitude of the subsequent cyclic error term can be from 1.5 to 3.0 nm.

Figure 9:
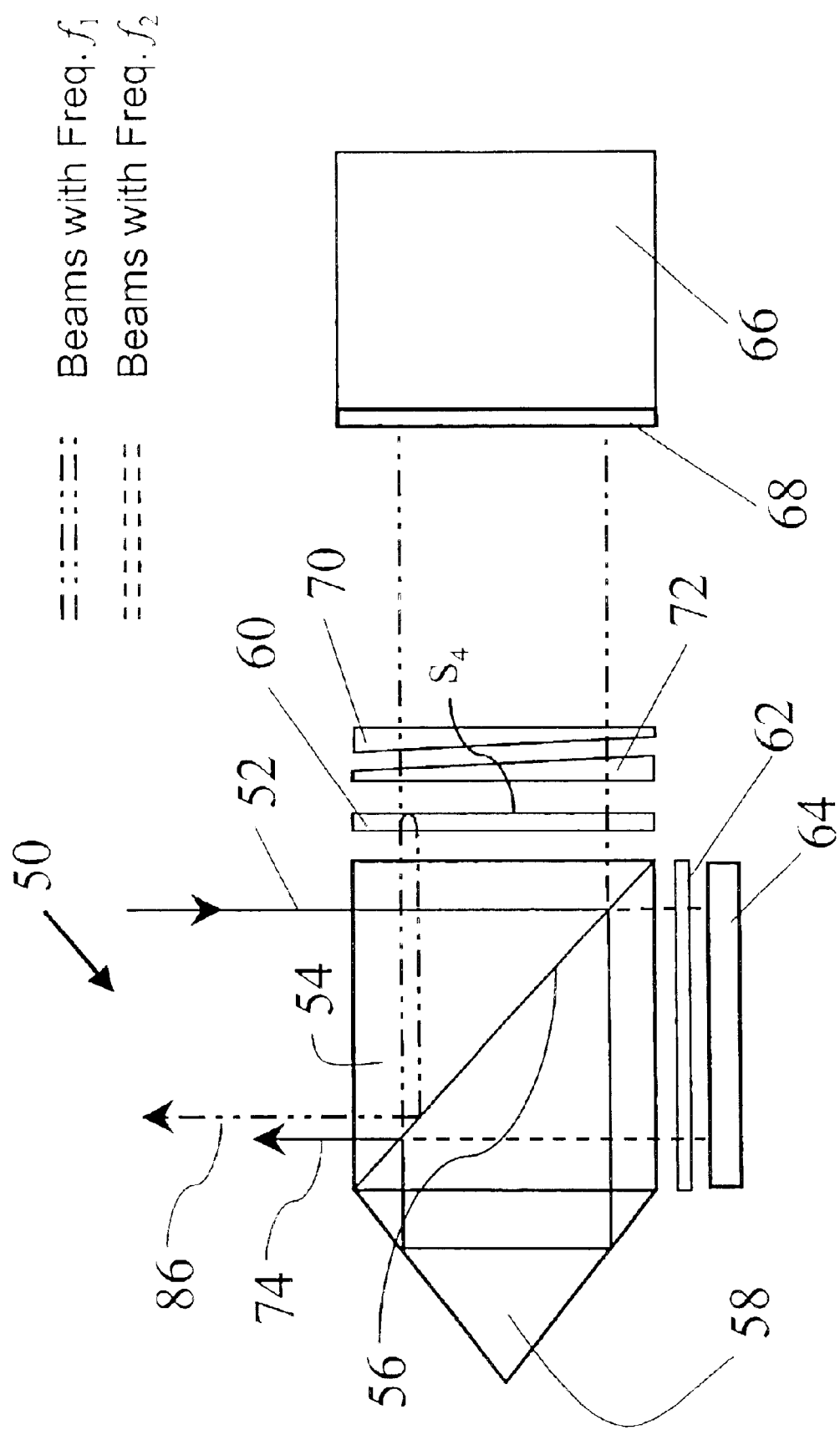

In FIG. 9, a ghost beam 86 is generated having as a source a reflection of the measurement beam from surface $S_4$ of quarter-wave plate 60. The amplitude of the subsequent cyclic error term can be from 1.5 to 3.0 nm.

Figure 10:
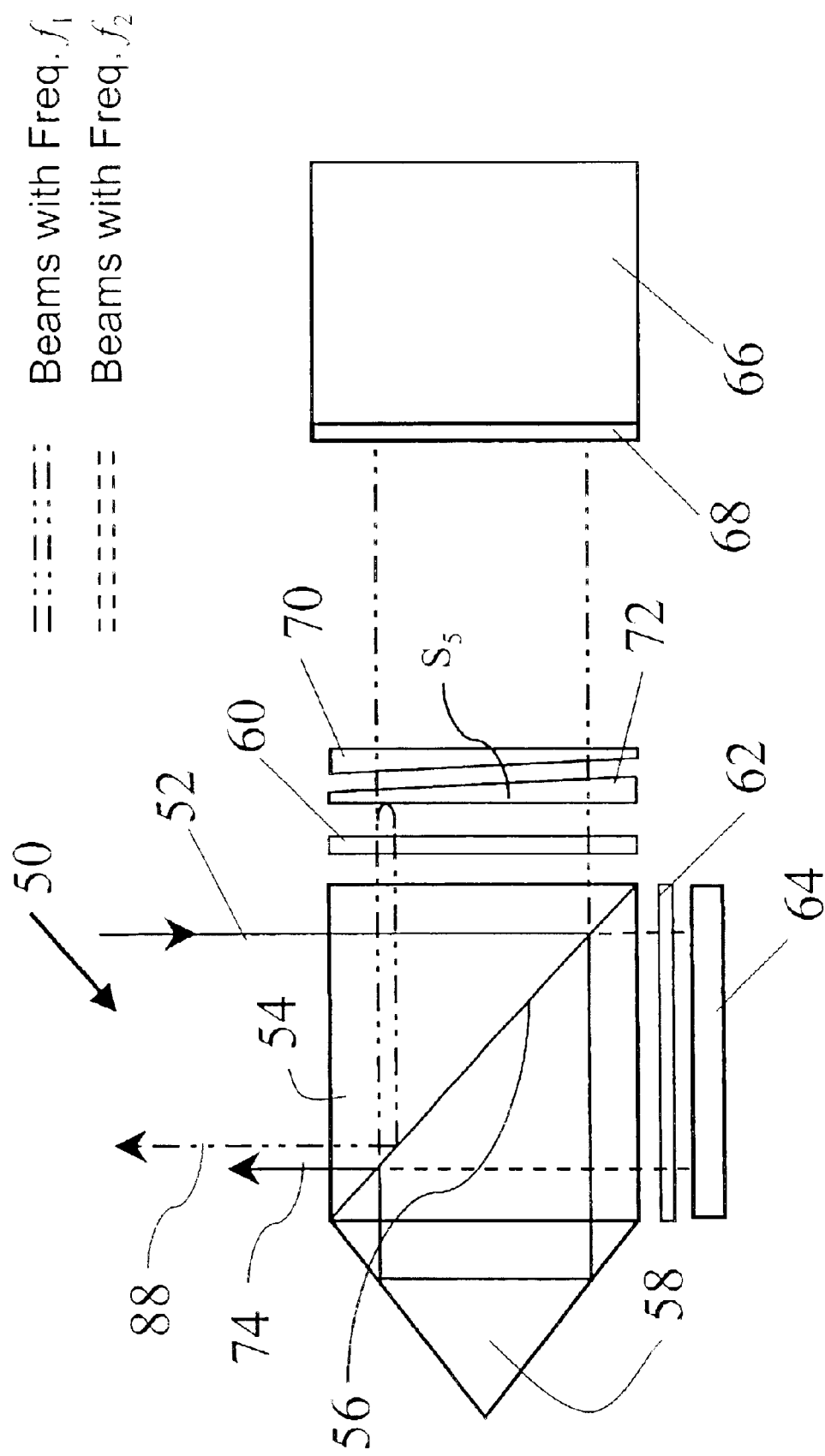

In FIG. 10, a ghost beam 88 is generated as the result of a reflection of the measurement beam from surface $S_5$ of steering wedge 72. The amplitude of the subsequent cyclic error term can be from 1.5 to 3.0 nm.

Figure 11:
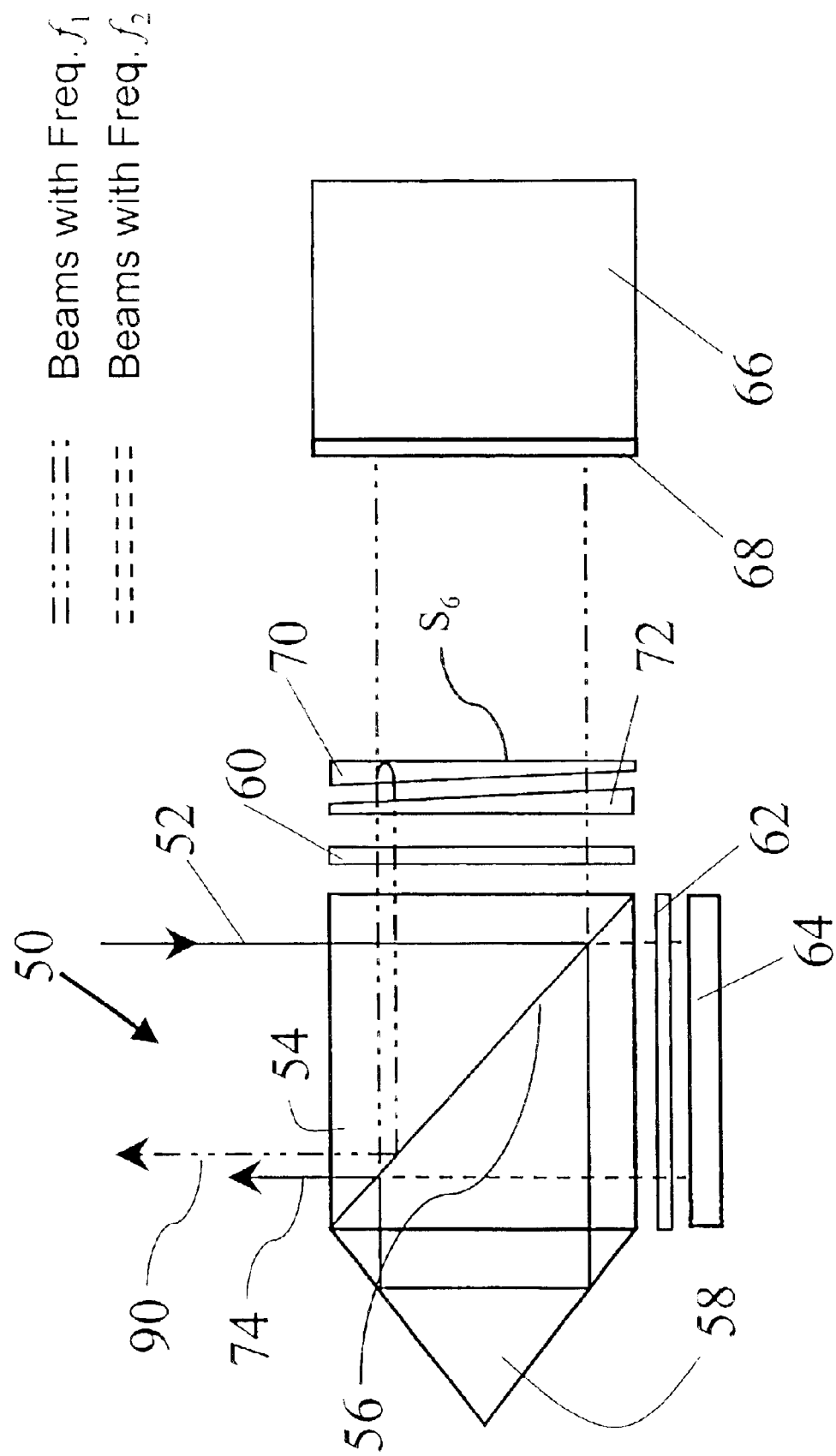

In FIG. 11, a ghost beam 90 is generated as the result of a reflection of the measurement beam from surface $S_6$ of steering wedge 70. The amplitude of the subsequent cyclic error term can be from 1.5 to 3.0 nm.

Reference is now made to FIGS. 12 through 15 which illustrate stage mirror dependent cyclic errors that arise when a reflecting surface from the exit mirror of the source laser cavity is optically aligned with a conjugate surface in the interferometer. In these figures, the laser cavity exit mirror is designated as 94.

Figure 12:
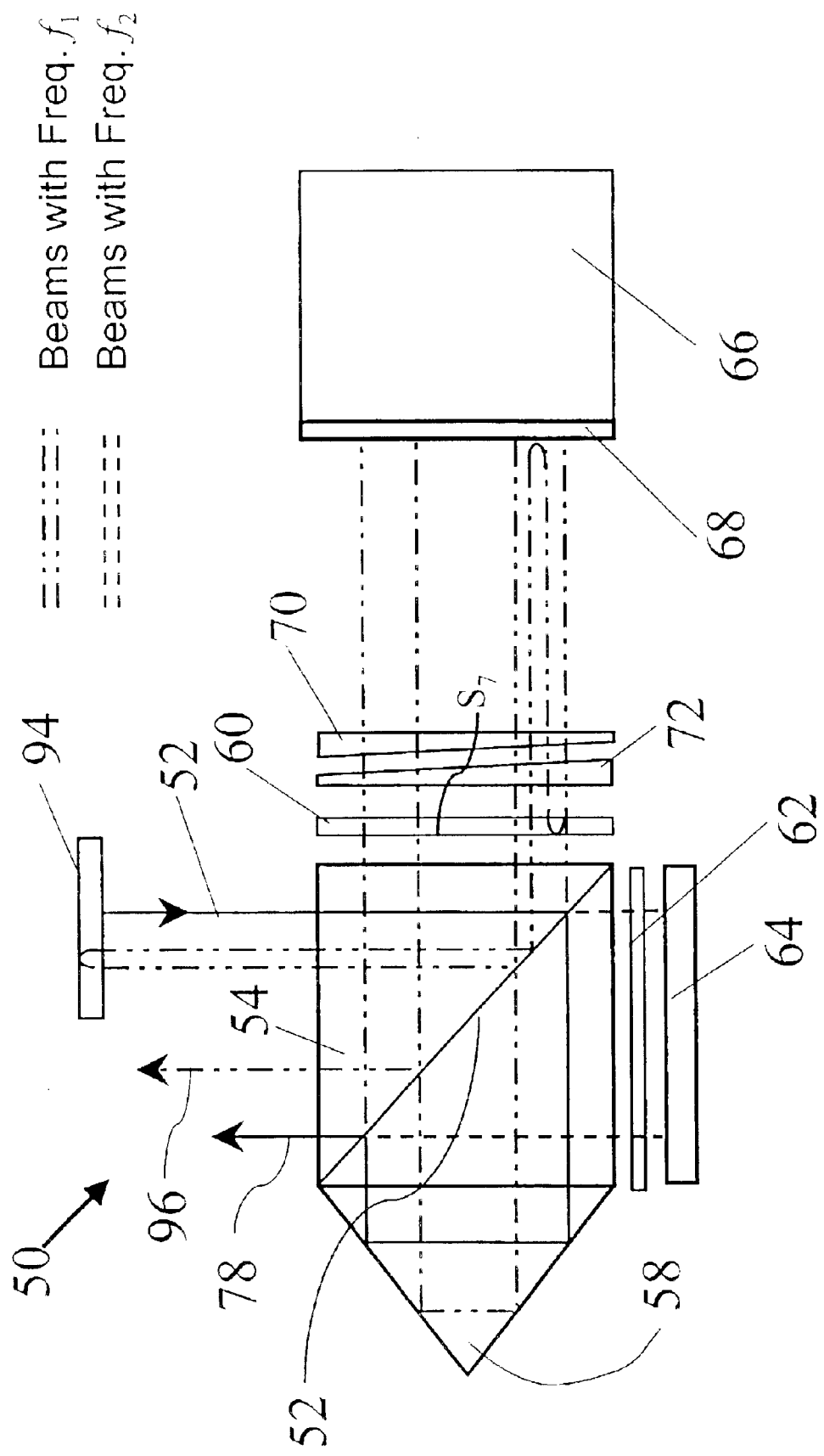
FIGS. 12 through 15 are diagrammatic illustrations of stage mirror dependent cyclic errors that can be present in the HSPMI of FIGS. 4 through 11 when the exit mirror of laser is optically aligned with another conjugate surface in the interferometer.

In FIG. 12, a ghost beam 96 is generated having as a source a reflection of the measurement beam from surface $S_7$ of steering wedge 70. The ghost beam here makes three passes to the object mirror 68 and one to the rear surface of the laser mirror 94. The subharmonic cyclic error term can have an amplitude from 0.6 to 1.2 nm.

Figure 13:
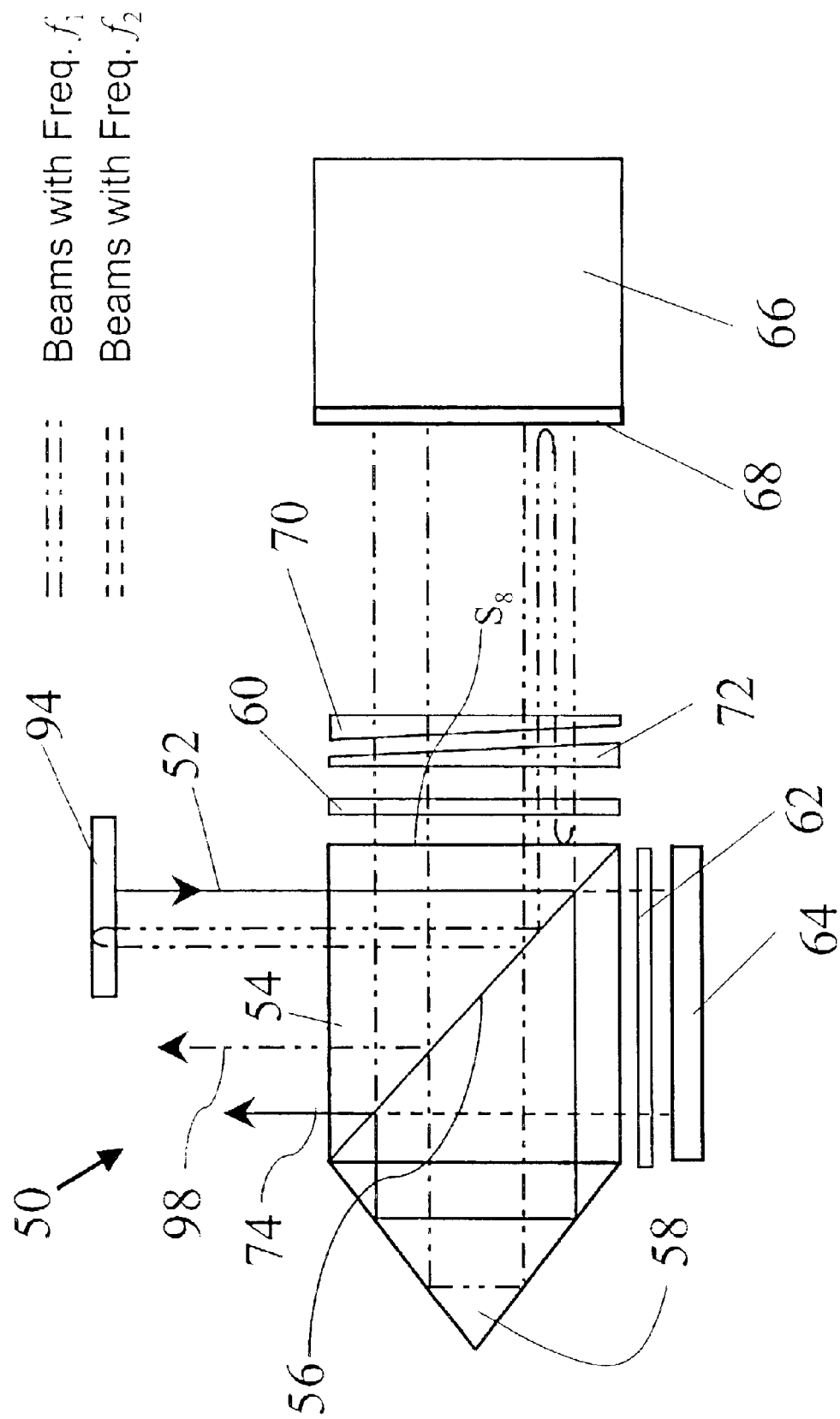

FIG. 13 is similar to FIG. 12 in that a ghost beam 98 is generated as the result of the initial reflection of the measurement beam from surface $S_8$ of polarizing beam splitter 54. The subharmonic cyclic error term can have an amplitude from 0.6 to 1.2 nm.

Figure 14:
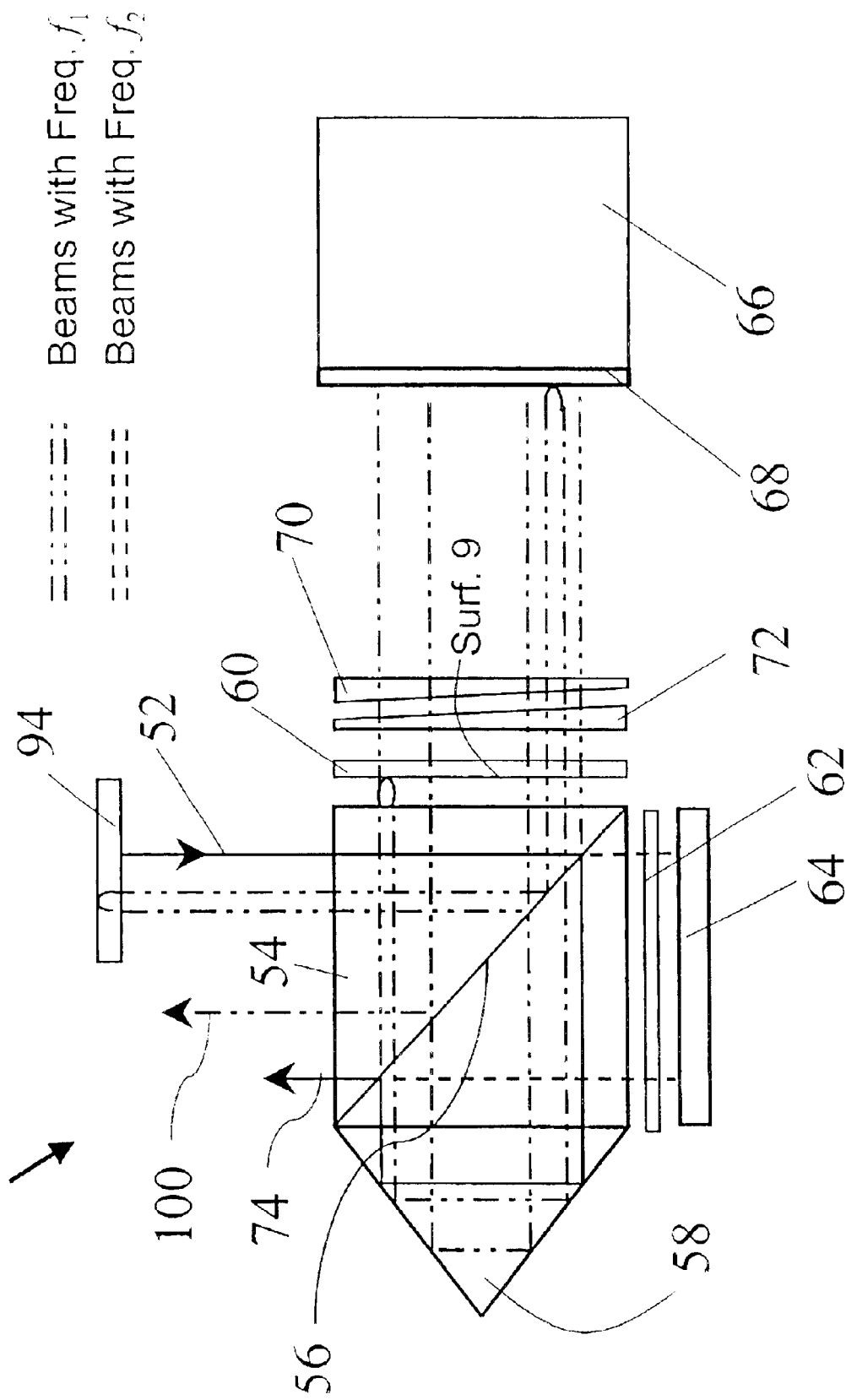

In FIG. 14, a ghost beam 100 is generated as the result of an initial reflection of the measurement beam from surface $S_9$ of quarter-wave plate 60. The subharmonic cyclic error term can have an amplitude from 0.6 to 1.2 nm.

Figure 15:
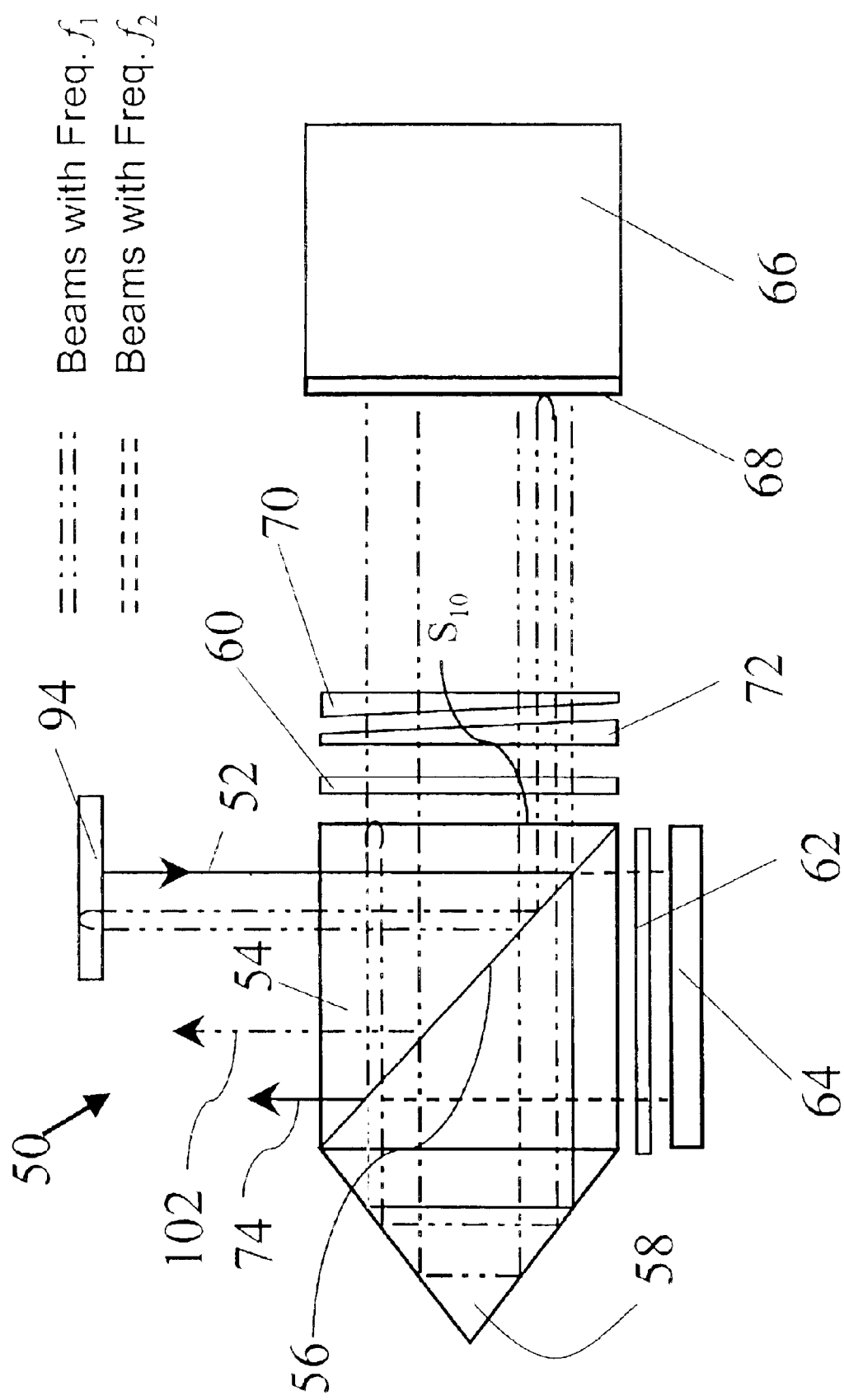

In FIG. 15, a ghost beam 102 is generated as the result of an initial reflection of the measurement beam from surface $S_{10}$ of polarizing beam splitter 54. The subharmonic cyclic error term can have an amplitude from 0.6 to 1.2 nm.

Figure 16:
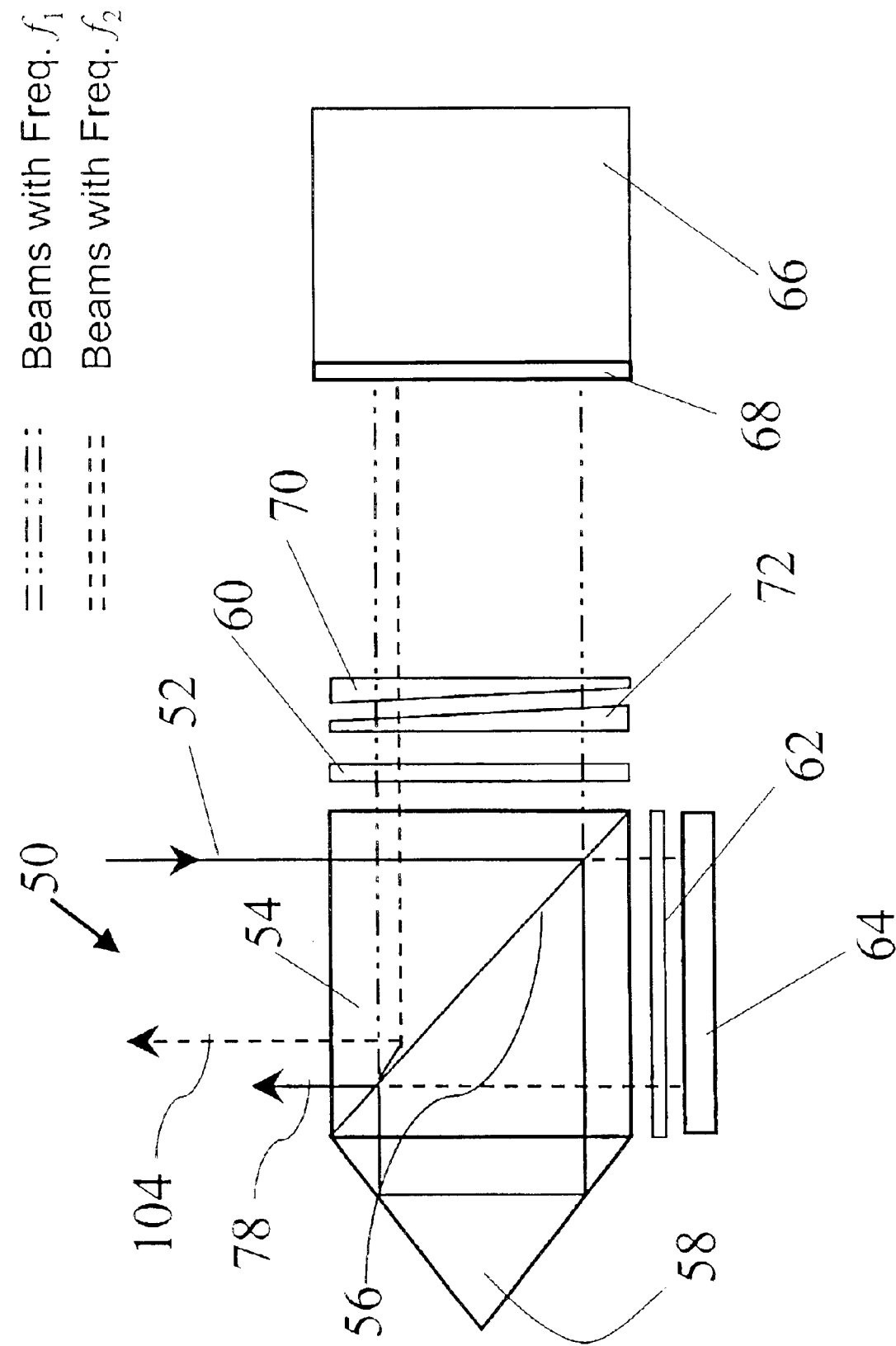
FIGS. 16 and 17 are diagrammatic illustrations of birefringence dependent cyclic errors that can be present in the HSPMI of FIGS. 4 through 15.
Figure 17:
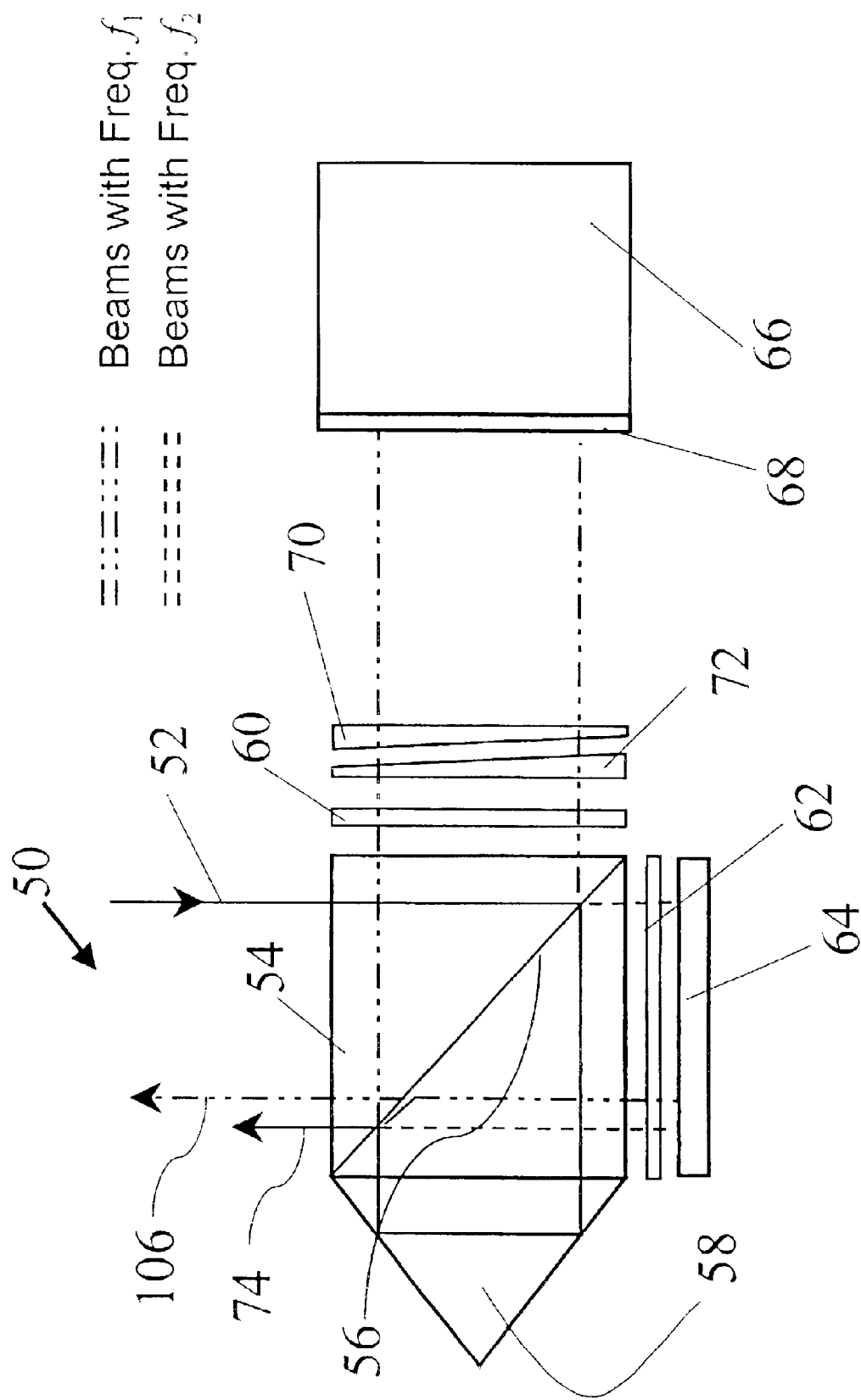

FIGS. 16 and 17 illustrate the generation of ghost beams due to birefringence in the glass components comprising interferometer system 50. In FIG. 16, a ghost beam 104 is generated when the reference beam has its polarization changed due to birefringence such that part of it travels to the object mirror 68 and back for combination with the main beam 74. Subharmonic cyclic error terms can be from approximately 0.5 nm/10 mm path length in amplitude.

In FIG. 17, a ghost beam 106 is generated when birefringence causes a portion of the measurement beam to travel to the reference mirror 64 and back for combination in main beam 74. Subharmonic cyclic error terms can be from approximately 0.5 nm/10 mm path length in amplitude.

Figure 18:
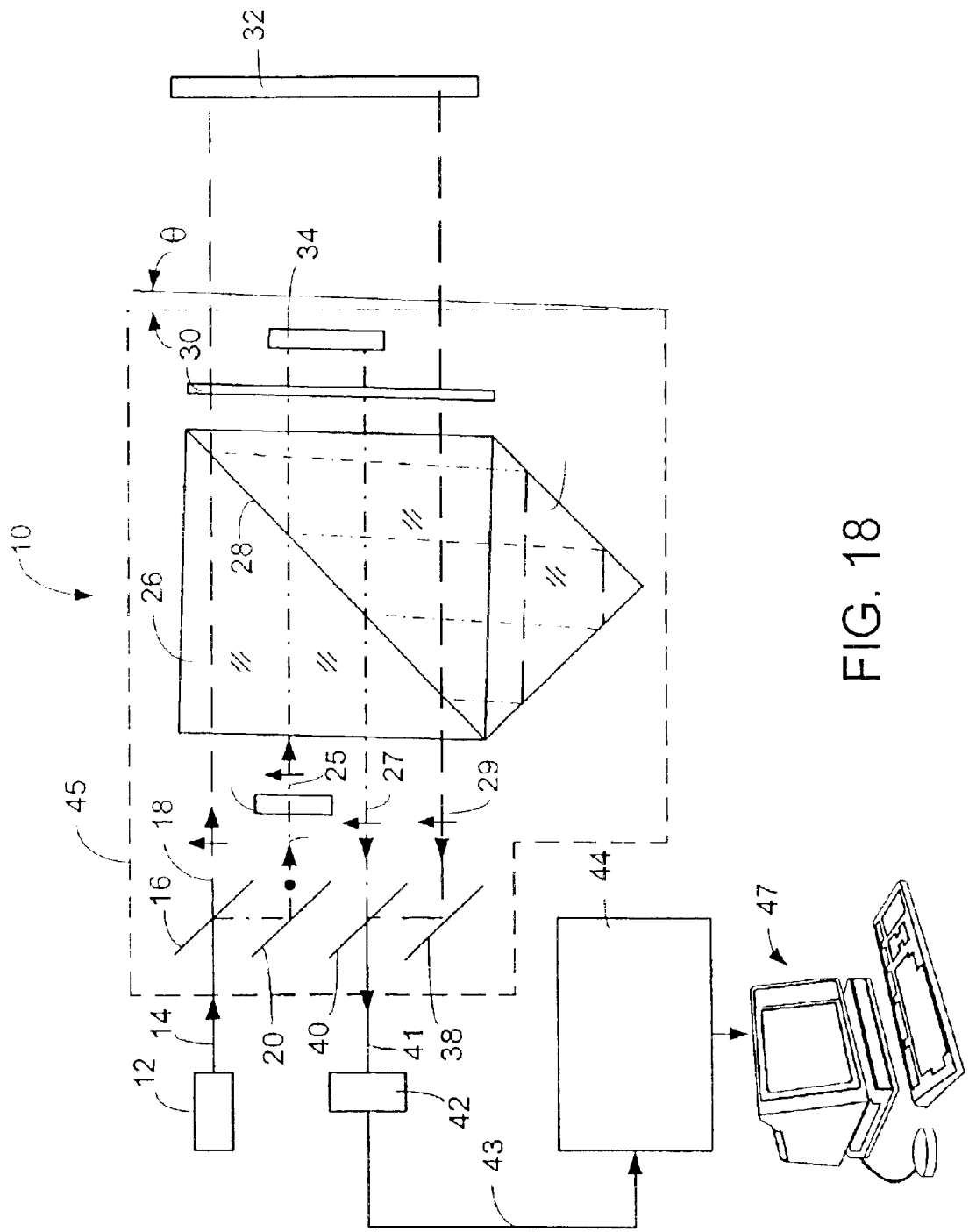
FIG. 18 shows the DPMI system of FIG. 1 with various components tilted to substantially eliminate and/or reduce cyclic errors.
Figure 19:
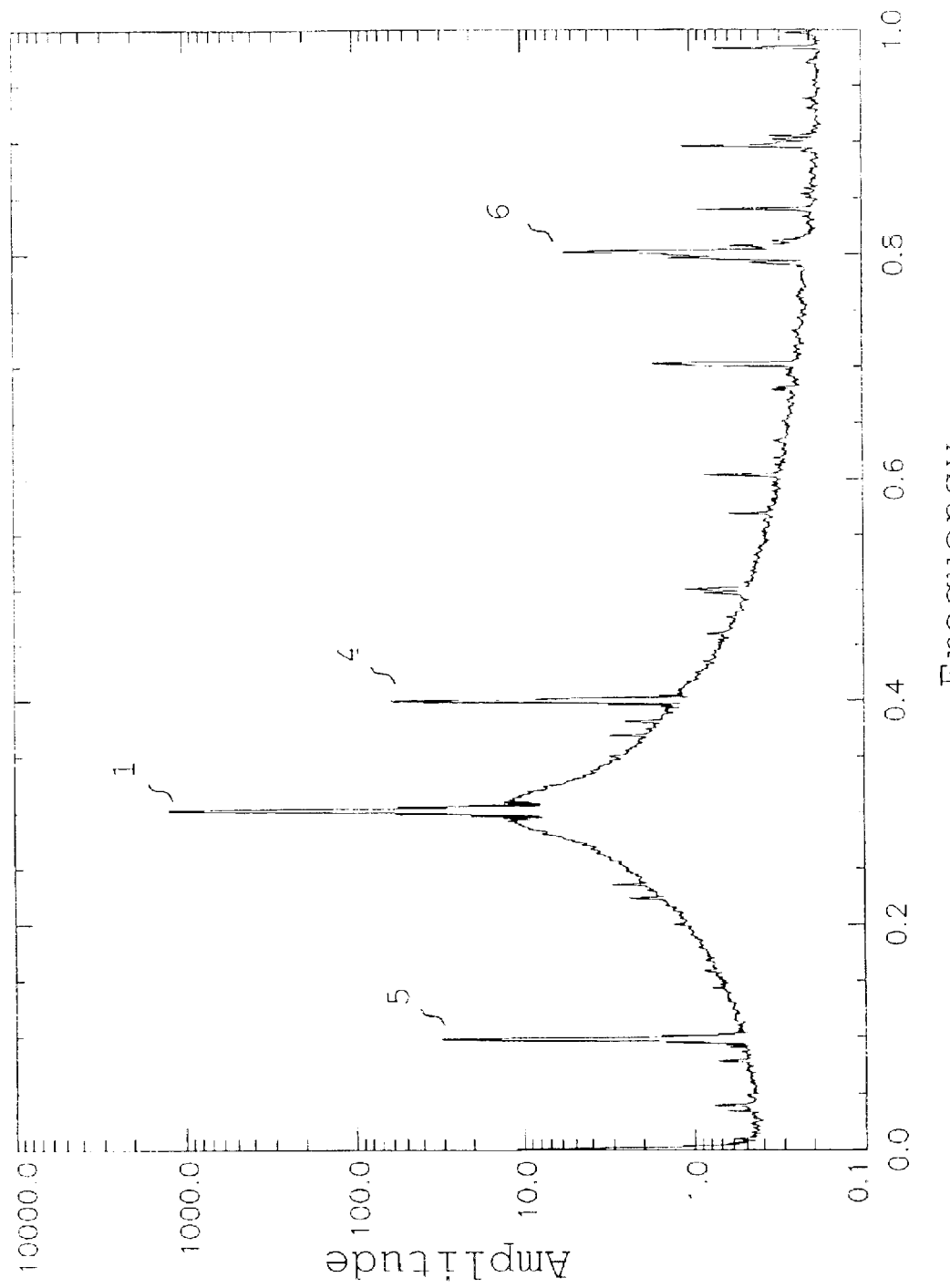
FIG. 19 is a graph similar to that of FIG. 3 illustrating the removal of significant cyclic errors as a result of tilting various components of the DPMI as shown in FIG. 18.

As will be appreciated, it is important to substantially eliminate or reduce the foregoing potential sources of cyclic errors since one or more be present at once, thus adding to substantial errors in distance measurement and or assessment of intrinsic optical properties. How this may be achieved will be understood by reference to FIG. 18, FIG. 18 illustrates the rotation or tilting of various components of interferometer system 10 to reduce or substantially eliminate cyclic errors that may otherwise be present in signal 43 from detector 42 previously illustrated in FIG. 3. As seen in FIG. 18, the components indicated by the dotted box 45 have been rotated by a small angle, θ, of 0.001 radians where the diameter of the input beam was 5 mm. The effect or rotating these interferometer components is shown in FIG. 19 which is a power spectrum of amplitude versus frequency of the detector output signal similar to that of FIG. 3. As is readily apparent from an inspection of the curve of FIG. 19, it is seen that peaks 2 and 3 have been eliminated as compared with FIG. 3 where they were substantial sources of error, being 4 nm and 2 nm, respectively.

Rotation of the majority of the components comprising interferometer system 10 as shown in FIG. 18 is the preferred solution for substantially eliminating and/or reducing cyclic errors when it is not known which ghost beams may be present in a system or whether one more potential cyclic error sources may be acting in concert. However, one or more components may be beneficially rotated when the source of the cyclic error can be identified with a priori knowledge or experimentation.

Figure 20:
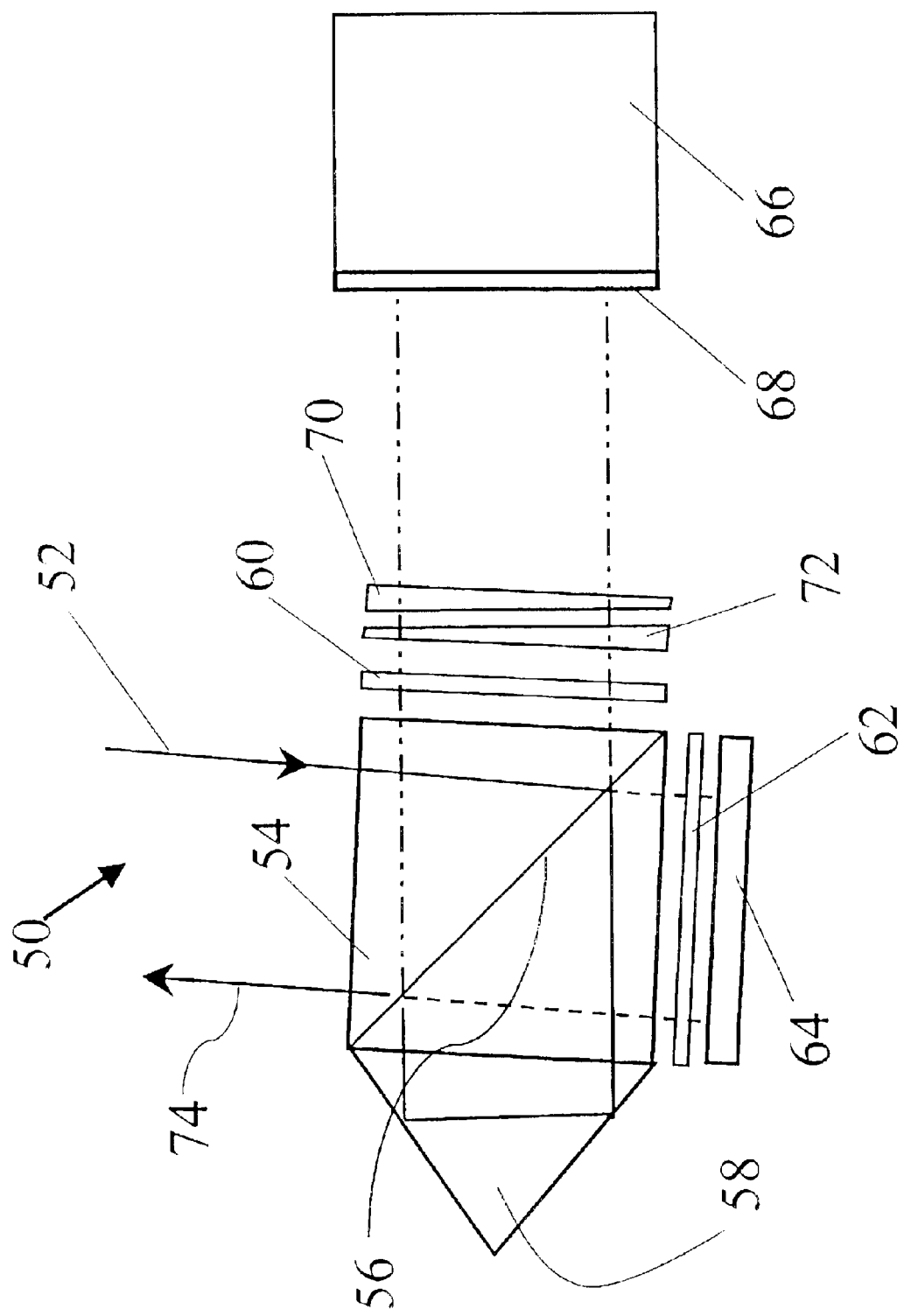
FIG. 20 is a diagrammatic representation of a solution for the substantial elimination of subharmonic cyclic errors by tilting the HSPMI interferometer appearing in FIGS. 4 through 17.

Reference is now made to FIG. 20 which shows that, except for stage 66, all of the other components of interferometer system 50 have been rotated by a small angle of ≅0.001 radians so that any of the previously identified surface pairs cannot be parallel to thereby substantially eliminate and/or reduce cyclic errors.

Figure 21:
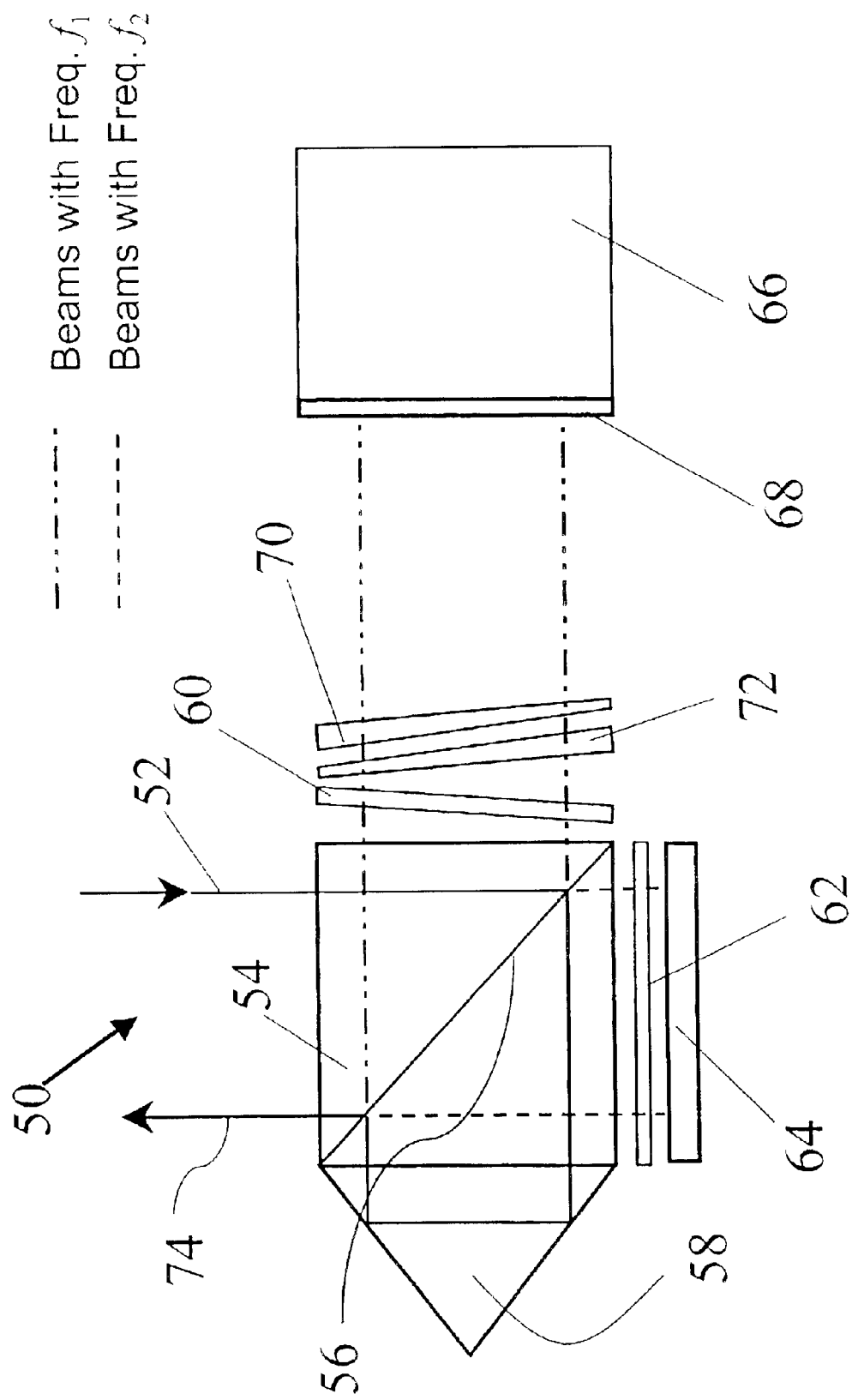
FIG. 21 is a diagrammatic representation of another solution for the substantial elimination of subharmonic cyclic errors by tilting certain elements of the HSPMI interferometer appearing in FIGS. 4 through 17.

FIG. 21 shows the opposite rotation in interferometer system 50 of quarter-wave plate 60 with respect to steering wedges 70 and 72 to achieve similar reductions in cyclic errors as was the case with the rotation illustrated with reference to FIG. 20. Here again, the angular rotation is ≅0.001 radians.

The major advantages achieved with this inventive approach is to reduce the need for more complex electronics to analyze and provide compensation for cyclic errors along with a relaxation on the requirements for accuracy.

The interferometry systems described above can be especially useful in lithography applications used for fabricating large scale integrated circuits such as computer chips and the like. Lithography is the key technology driver for the semiconductor manufacturing industry. Overlay improvement is one of the five most difficult challenges down to and below 100 nm line widths (design rules), see for example the *Semiconductor Industry Roadmap*, p82 (1997). Overlay depends directly on the performance, i.e. accuracy and precision, of the distance measuring interferometers used to position the wafer and reticle (or mask) stages. Since a lithography tool may produce $50–100 M/year of product, the economic value from improved performance distance measuring interferometers is substantial. Each 1% increase in yield of the lithography tool results in approximately $1 M/year economic benefit to the integrated circuit manufacturer and substantial competitive advantage to the lithography tool vendor.

The function of a lithography tool is to direct spatially patterned radiation onto a photoresist-coated wafer. The process involves determining which location of the wafer is to receive the radiation (alignment) and applying the radiation to the photoresist at that location (exposure).

To properly position the wafer, the wafer includes alignment marks on the wafer that can be measured by dedicated sensors. The measured positions of the alignment marks define the location of the wafer within the tool. This information, along with a specification of the desired patterning of the wafer surface, guides the alignment of the wafer relative to the spatially patterned radiation. Based on such information, a translatable stage, such as stage 66 of system 50, supporting the photoresist-coated wafer moves the wafer such that the radiation will expose the correct location of the wafer.

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photo-chemical processes in the photoresist that convert the radiation pattern into a latent image within the photoresist.

The interferometry systems described above are important components of the positioning mechanisms that control the position of the wafer and reticle, and register the reticle image on the wafer.

In general, the lithography system, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes photoresist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithography: Science and Technology* (Marcel Dekker, Inc., New York, 1998), the contents of which are incorporated herein by reference.

The interferometry systems described above can be used to precisely measure the positions of each of the wafer stage and mask stage relative to other components of the exposure system, such as the lens assembly, radiation source, or support structure. In such cases, the interferometry system can be attached to a stationary structure and the measurement object attached to a movable element such as one of the mask and wafer stages. Alternatively, the situation can be reversed, with the interferometry system attached to a movable object and the measurement object attached to a stationary object.

More generally, the interferometry systems can be used to measure the position of any one component of the exposure system relative to any other component of the exposure system in which the interferometry system is attached, or supported by one of the components and the measurement object is attached, or is supported by the other of the components.

Figure 22:
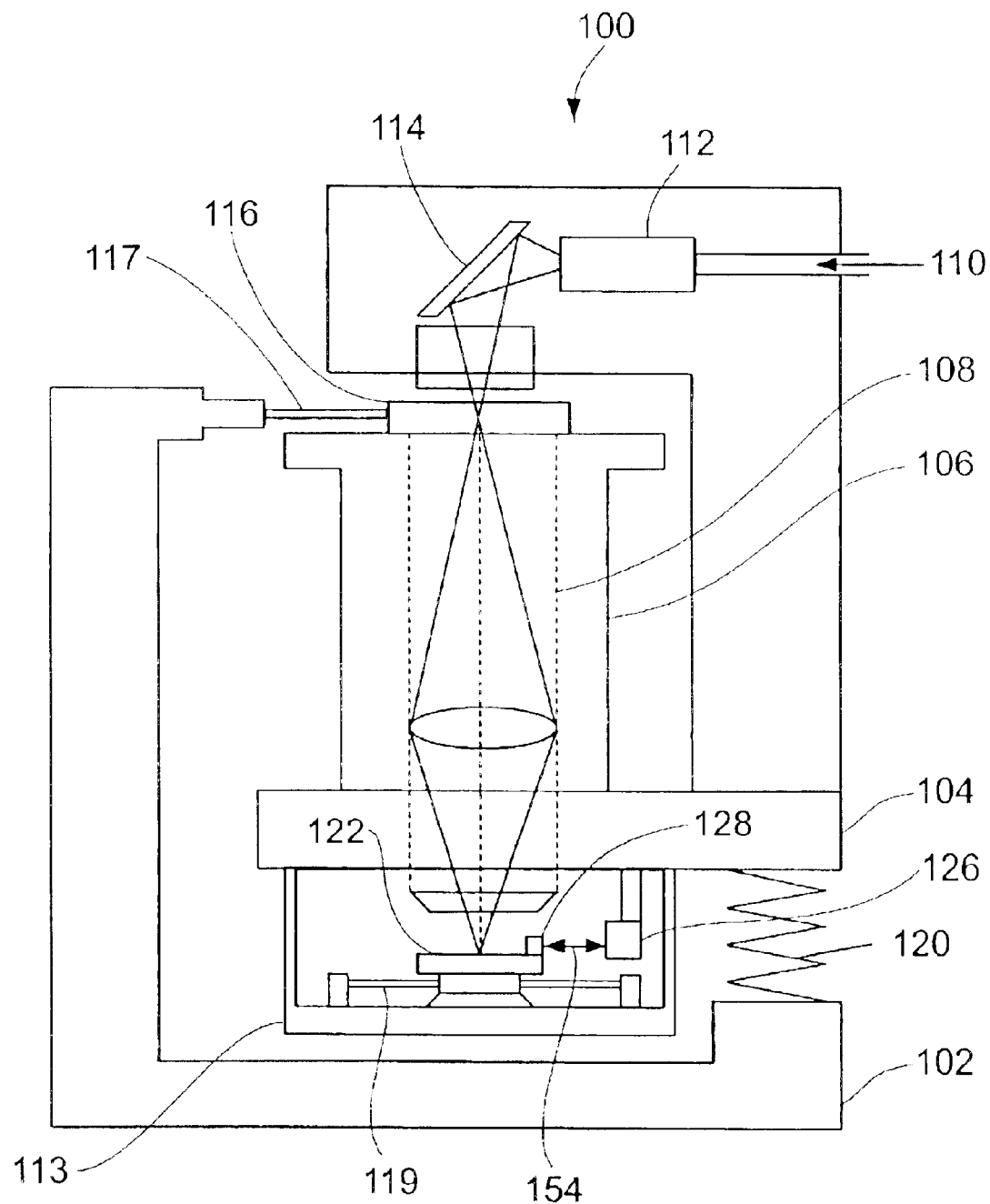

An example of a lithography scanner 100 using an interferometry system 126 is shown in FIG. 22. The interferometry system is used to precisely measure the position of a wafer within an exposure system. Here, stage 122 is used to position the wafer relative to an exposure station. Scanner 100 comprises a frame 102, which carries other support structures and various components carried on those structures. An exposure base 104 has mounted on top of it a lens housing 106 atop of which is mounted a reticle or mask stage 116 used to support a reticle or mask. A positioning system for positioning the mask relative to the exposure station is indicated schematically by element 117. Positioning system 117 can include, e.g., piezoelectric transducer elements and corresponding control electronics. Although, it is not included in this described embodiment, one or more of the interferometry systems described above can also be used to precisely measure the position of the mask stage as well as other moveable elements whose position must be accurately monitored in processes for fabricating lithographic structures (see supra Sheats and Smith *Microlithography: Science and Technology*).

Suspended below exposure base 104 is a support base 113 that carries wafer stage 122. Stage 122 includes a plane mirror for reflecting a measurement beam 154 directed to the stage by interferometry system 126. A positioning system for positioning stage 122 relative to interferometry system 126 is indicated schematically by element 119. Positioning system 119 can include, e.g., piezoelectric transducer elements and corresponding control electronics. The measurement beam reflects back to the interferometry system, which is mounted on exposure base 104. The interferometry system can be any of the embodiments described previously.

During operation, a radiation beam 110, e.g., an ultraviolet (UV) beam from a UV laser (not shown), passes through a beam shaping optics assembly 112 and travels downward after reflecting from mirror 114. Thereafter, the radiation beam passes through a mask (not shown) carried by mask stage 116. The mask (not shown) is imaged onto a wafer (not shown) on wafer stage 122 via a lens assembly 108 carried in a lens housing 106. Base 104 and the various components supported by it are isolated from environmental vibrations by a damping system depicted by spring 120.

In other embodiments of the lithographic scanner, one or more of the interferometry systems described previously can be used to measure distance along multiple axes and angles associated for example with, but not limited to, the wafer and reticle (or mask) stages. Also, rather than a UV laser beam, other beams can be used to expose the wafer including, e.g., x-ray beams, electron beams, ion beams, and visible optical beams.

In addition, the lithographic scanner can include a column reference in which interferometry system 126 directs the reference beam to lens housing 106 or some other structure that directs the radiation beam rather than a reference path internal to the interferometry system. The interference signal produced by interferometry system 126 when combining measurement beam 154 reflected from stage 122 and the reference beam reflected from lens housing 106 indicates changes in the position of the stage relative to the radiation beam. Furthermore, in other embodiments the interferometry system 126 can be positioned to measure changes in the position of reticle (or mask) stage 116 or other movable components of the scanner system. Finally, the interferometry systems can be used in a similar fashion with lithography systems involving steppers, in addition to, or rather than, scanners.

Figure 23:
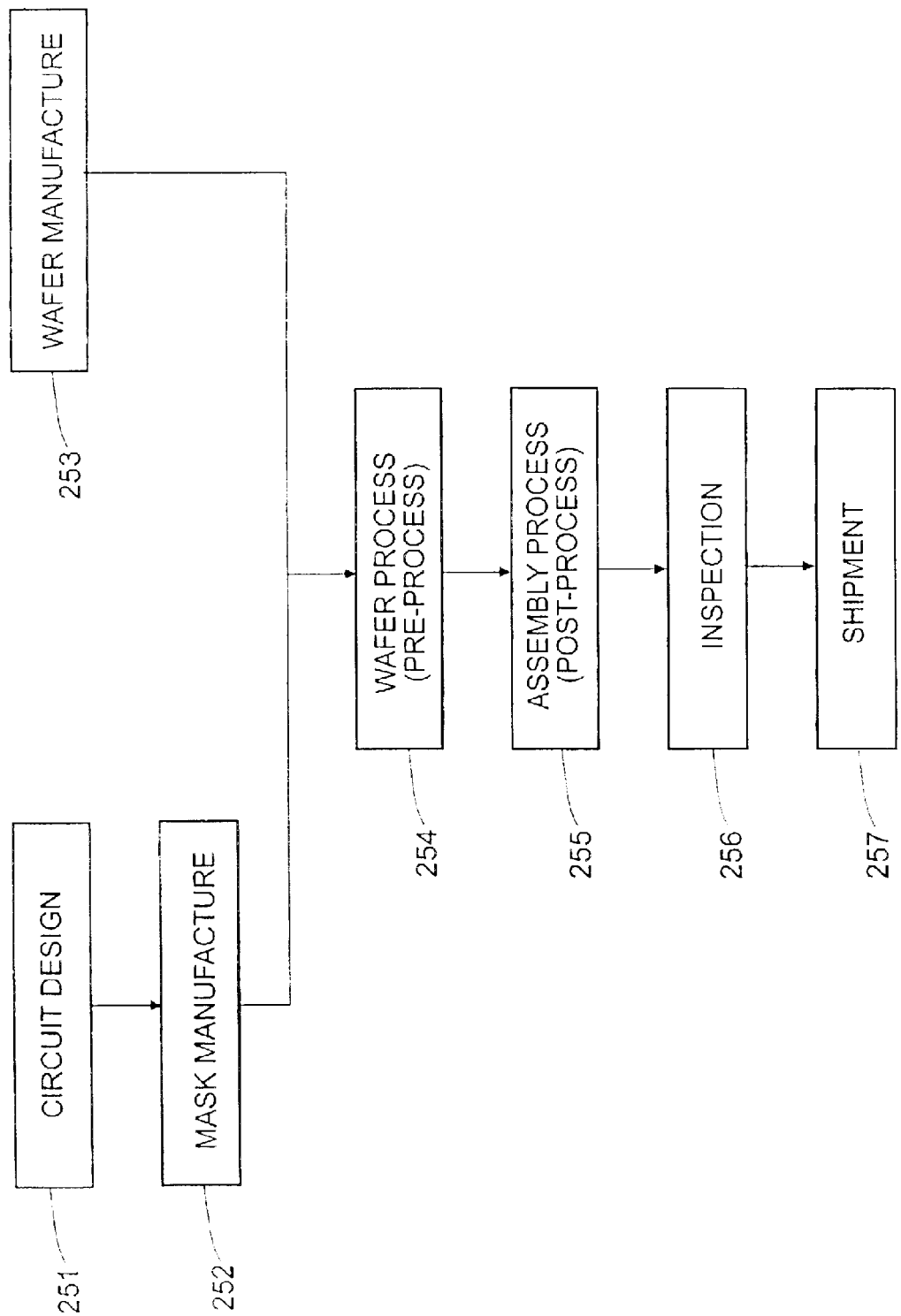

As is well known in the art, lithography is a critical part of manufacturing methods for making semiconducting devices. For example, U.S. Pat. No. 5,483,343 outlines steps for such manufacturing methods. These steps are described below with reference to FIGS. 23 and 24. FIG. 23 is a flow chart of the sequence of manufacturing a semiconductor device such as a semiconductor chip (e.g. IC or LSI), a liquid crystal panel or a CCD. Step 251 is a design process for designing the circuit of a semiconductor device. Step 252 is a process for manufacturing a mask on the basis of the circuit pattern design. Step 253 is a process for manufacturing a wafer by using a material such as silicon.

Step 254 is a wafer process which is called a pre-process wherein, by using the so prepared mask and wafer, circuits are formed on the wafer through lithography. Step 255 is an assembling step, which is called a post-process wherein the wafer processed by step 254 is formed into semiconductor chips. This step includes assembling (dicing and bonding) and packaging (chip sealing). Step 256 is an inspection step wherein operability check, durability check, and so on of the semiconductor devices produced by step 255 are carried out. With these processes, semiconductor devices are finished and they are shipped (step 257).

Figure 24:
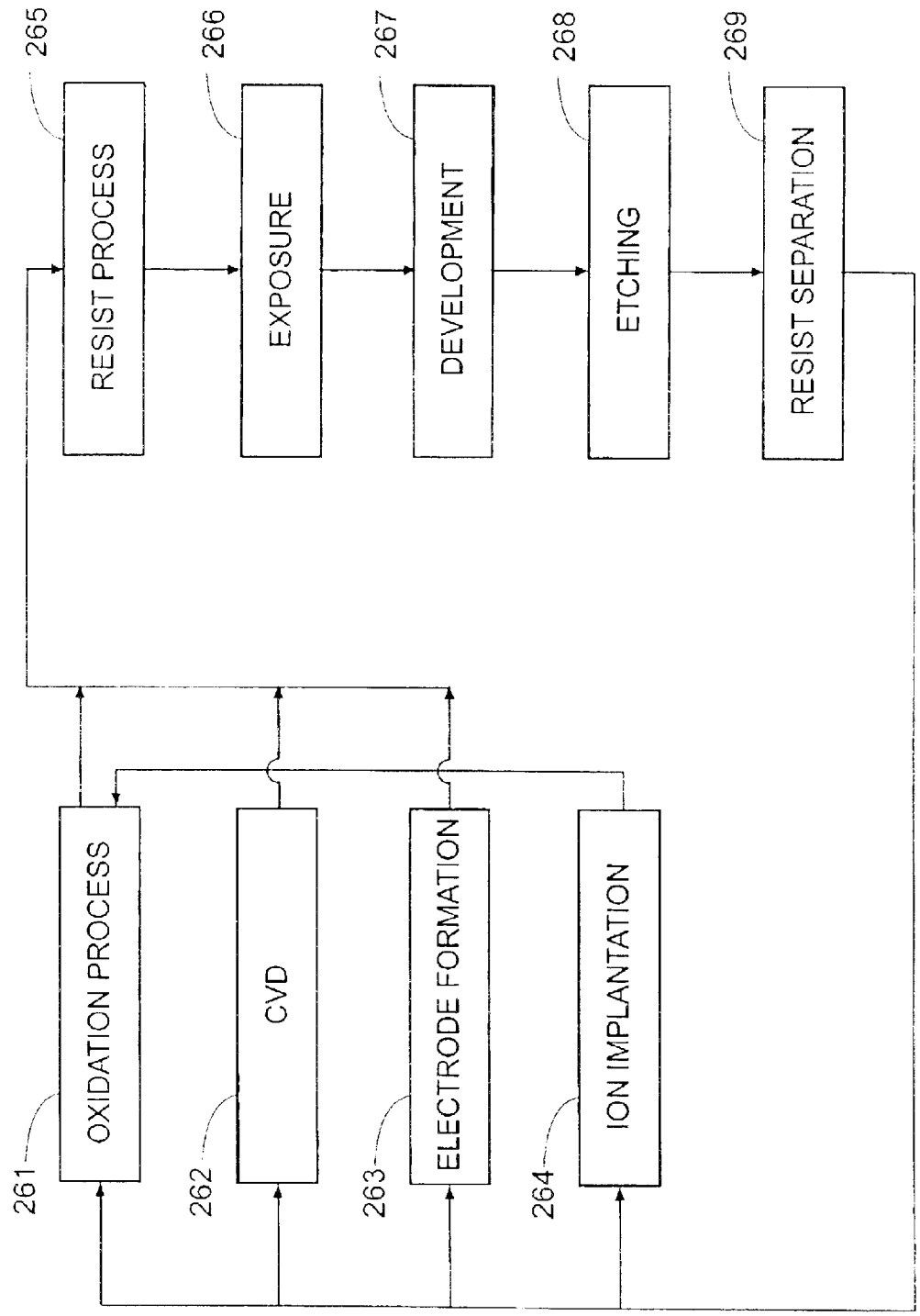

FIG. 24 is a flow chart showing details of the wafer process. Step 261 is an oxidation process for oxidizing the surface of a wafer. Step 262 is a CVD process for forming an insulating film on the wafer surface. Step 263 is an electrode forming process for forming electrodes on the wafer by vapor deposition. Step 264 is an ion implanting process for implanting ions to the wafer. Step 265 is a photoresist process for applying a photoresist (photosensitive material) to the wafer. Step 266 is an exposure process for printing, by exposure, the circuit pattern of the mask on the wafer through the exposure apparatus described above. Step 267 is a developing process for developing the exposed wafer. Step 268 is an etching process for removing portions other than the developed photoresist image. Step 269 is a photoresist separation process for separating the photoresist material remaining on the wafer after being subjected to the etching process. By repeating these processes, circuit patterns are formed and superimposed on the wafer.

The interferometry systems described above can also be used in other applications in which the relative position of an object needs to be measured precisely. For example, in applications in which a write beam such as a laser, x-ray, ion, or electron beam, marks a pattern onto a substrate as either the substrate or beam moves, the interferometry systems can be used to measure the relative movement between the substrate and write beam.

Figure 25:
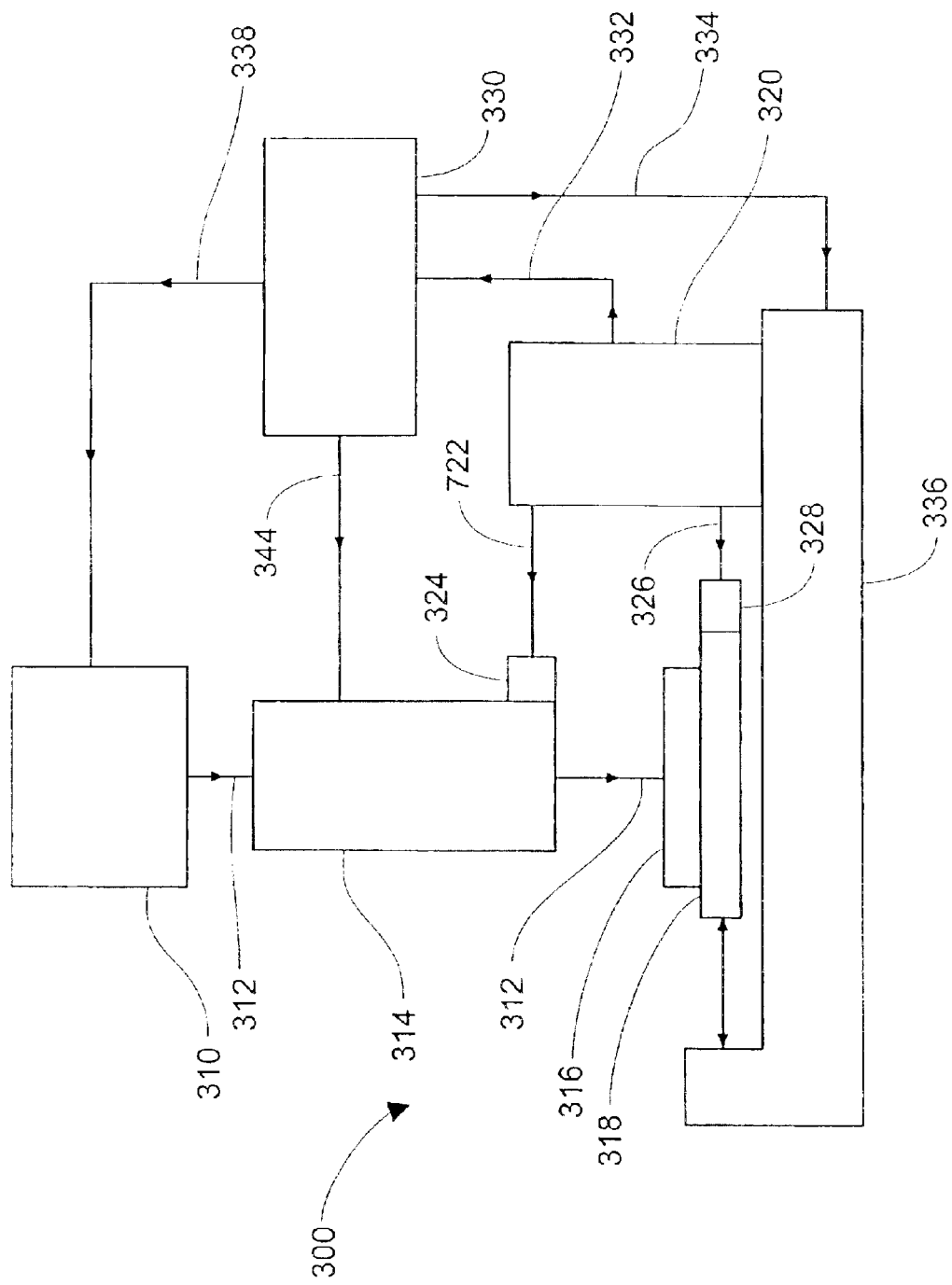

As an example, a schematic of a beam writing system 300 is shown in FIG. 25. A source 310 generates a write beam 312, and a beam focusing assembly 314 directs the radiation beam to a substrate 316 supported by a movable stage 318. To determine the relative position of the stage, an interferometry system 320 directs a reference beam 322 to a mirror 324 mounted on beam focusing assembly 314 and a measurement beam 326 to a mirror 328 mounted on stage 318. Interferometry system 320 can be any of the interferometry systems described previously. Changes in the position measured by the interferometry system correspond to changes in the relative position of write beam 312 on substrate 316. Interferometry system 320 sends a measurement signal 332 to controller 330 that is indicative of the relative position of write beam 312 on substrate 316. Controller 330 sends an output signal 334 to a base 336 that supports and positions stage 318. In addition, controller 330 sends a signal 338 to source 310 to vary the intensity of, or block, write beam 312 so that the write beam contacts the substrate with an intensity sufficient to cause photophysical or photochemical change only at selected positions of the substrate. Furthermore, in some embodiments, controller 330 can cause beam focusing assembly 314 to scan the write beam over a region of the substrate, e.g., using signal 344. As a result, controller 330 directs the other components of the system to pattern the substrate. The patterning is typically based on an electronic design pattern stored in the controller. In some applications the write beam patterns a photoresist coated on the substrate and in other applications the write beam directly patterns, e.g., etches, the substrate.

An important application of such a system is the fabrication of masks and reticles used in the lithography methods described previously. For example, to fabricate a lithography mask an electron beam can be used to pattern a chromium-coated glass substrate. In such cases where the write beam is an electron beam, the beam writing system encloses the electron beam path in a vacuum. Also, in cases where the write beam is, e.g., an electron or ion beam, the beam focusing assembly includes electric field generators such as quadrapole lenses for focusing and directing the charged particles onto the substrate under vacuum. In other cases where the write beam is a radiation beam, e.g., x-ray, UV, or visible radiation, the beam focusing assembly includes corresponding optics for focusing and directing the radiation to the substrate.

Yet other changes may be made to the invention. For example, it may be desirable in certain applications to monitor the refractive index of the gas contained on both the reference and in the measurement legs of the interferometer. Examples include the well-known column reference style of interferometer, in which the reference leg comprises a target optic placed at one position within a mechanical system, and the measurement leg comprises a target optic placed at a different position within the same mechanical system. Another example application relates to the measurement of small angles, for which both the measurement and reference beams impinge upon the same target optic but at a small physical offset, thereby providing a sensitive measure of the angular orientation of the target optic. These applications and configurations are well known to those skilled in the art and the necessary modifications are intended to be within the scope of the invention.

Based on the teachings and embodiments described hereinabove, other variations of the invention will be apparent to those skilled in the relevant art and such variations are intended to be within the scope of the claimed invention.

What is claimed is:

1. Polarization interferometric apparatus, said apparatus comprising interferometer means for receiving at least two beams and providing first and second measurement legs, separating said two beams for travel along said first and second measurement legs, respectively, and generating exit beams containing information about the respective differences in the optical paths each beam experienced in traveling said first and second measurement legs, said first and second measurement legs having optical paths structured and arranged such that at least one of them has a variable physical length, the optical path length difference between said first and second measurement legs varying in accordance with the difference between the respective physical lengths of their optical paths, said interferometer means comprising a plurality of optical components including a stage carrying a plane object mirror moveable along one of said measurement paths; said plurality of optical components other than said stage and said plane object mirror being rotated collectively with respect to said stage and said plane object mirror by a small angle in the same angular direction, for substantially eliminating and reducing subharmonic cyclic error contributions that may otherwise overlap and interfere with interfering components in said exit beams.

2. The polarization interferometric apparatus of claim 1 further including means for combining said exit beams to produce mixed optical signals containing information corresponding to the phase differences between each of said exit beams from corresponding ones of said predetermined optical paths of said first and second measurement legs.

3. The polarization interferometric apparatus of claim 2 further including means for detecting said mixed optical signals and generating electrical interference signals containing information corresponding to difference in physical path lengths of said measurement legs and their relative rate of change.

4. The polarization interferometric apparatus of claim 3 further including electronic means for analyzing said electrical interference signals.

5. The polarizatoin interferometric apparatus of claim 1 wherein said interferometer means comprises at least one polarizing beamsplitter that is structured and arranged for separating orthogonally polarized beams for travel along corresponding ones of said first and second measurement legs.

6. The polarization interferometric apparatus of claim 1 wherein said beams travel along a coextensive path.

7. The polarization interferometric apparatus of claim 1 wherein said plurality of optical components includes a polarizing beam splitter having a plurality of faces, a first fixed plane reference mirror arranged adjacent a predetermined one of said faces, a first quarter-wave plate located adjacent a predetermined one of said faces, and said moveable stage carrying a plane object mirror; all of said plurality of optical components other than stage and plane object mirror being rotated by a small angle, in the same angular direction, with respect to said stage and plane object mirror.

8. The polarization interferometric apparatus of claim 7 wherein said interferometer is arranged so that said orthogonally polarized beams make a double pass therethrough.

9. The polarization interferometric apparatus of claim 1 further including a microlithographic means operatively associated with said polarization interferometric apparatus for fabricating wafers, said microlithographic means comprising:
   at least one stage for supporting a wafer;
   an illumination system for imaging spatially patterned radiation onto the wafer and
   a positioning system for adjusting the position of said at least one stage relative to the imaged radiation;
   wherein said polarization interferometric apparatus is adapted to measure the position of the wafer relative to the imaged radiation.

10. The polarization interferometric apparatus of claim 1 further including a microlithographic means operatively associated with said polarization interferometric apparatus for use in fabricating integrated circuits on a wafer, said microlithographic means comprising:

at least one stage for supporting a wafer;

an illumination system including a radiation source, a mask, a positioning system, a lens assembly, and predetermined portions of said polarization interferometric apparatus, said microlithographic means being operative such that the source directs radiation through said mask to produce spatially patterned radiation, said positioning system adjusts the position of said mask relative to radiation from said source, said lens assembly images said spatially patterned radiation onto the wafer, and said polarization interferometric apparatus measures the position of said mask relative to said radiation from said source.

11. The polarization interferometric apparatus of claim 1 further including microlithographic apparatus operatively associated with said polarization interferometric apparatus for fabricating integrated circuits comprising first and second components, said first and second components being moveable relative to one another and said polarization interferometric apparatus, said first and second components being connected with said first and second measurement legs, respectively, moving in concert therewith, such that said polarization interferometric apparatus measures the position of said first component relative to said second component.

12. The polarization interferometric apparatus of claim 1 further including a beam writing system operatively associated with said polarization interferometric apparatus for use in fabricating a lithography mask, said beam writing system comprising:

a source for providing a write beam to pattern a substrate;

at least one stage for supporting a substrate;

a beam directing assembly for delivering said write beam to the substrate; and a positioning system for positioning said at least one stage and said beam directing assembly relative to one another, said polarization interferometric apparatus being adapted to measure the position of said at least one stage relative to said beam directing assembly.

* * * * *